US012799267B2

(12) United States Patent
Pingitore et al.

(10) Patent No.: US 12,799,267 B2
(45) Date of Patent: Nov. 17, 2026

(54) CAPPED BISPHENOL POLYINDANE OLIGOMER AND COMPOSITION, METHOD OF MANUFACTURE, AND ARTICLES MADE THEREFROM

(71) Applicant: SHPP GLOBAL TECHNOLOGIES B.V., Bergen Op Zoom (NL)

(72) Inventors: Andrew Thomas Pingitore, Evansville, IN (US); James Alan Mahood, Evansville, IN (US); Eylem Tarkin-Tas, Delmar, NY (US); Yasser Dhahir, Selkirk, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 463 days.

(21) Appl. No.: 18/283,062

(22) PCT Filed: May 3, 2022

(86) PCT No.: PCT/IB2022/054083
§ 371 (c)(1),
(2) Date: Sep. 20, 2023

(87) PCT Pub. No.: WO2022/234455
PCT Pub. Date: Nov. 10, 2022

(65) Prior Publication Data
US 2024/0174790 A1 May 30, 2024

(30) Foreign Application Priority Data
May 4, 2021 (EP) .................................... 21172123

(51) Int. Cl.
*C08G 61/04* (2006.01)
*C08F 290/06* (2006.01)

(52) U.S. Cl.
CPC ............ *C08G 61/04* (2013.01); *C08F 290/06* (2013.01); *C08F 2810/40* (2013.01); *C08G 2261/1412* (2013.01); *C08G 2261/342* (2013.01); *C08G 2261/42* (2013.01)

(58) Field of Classification Search
CPC ...................................................... C08G 61/00
See application file for complete search history.

(56) References Cited

U.S. PATENT DOCUMENTS

| | | | | |
|---|---|---|---|---|
| 4,334,106 A | | 6/1982 | Dai | |
| 4,988,785 A | | 1/1991 | Paul et al. | |
| 5,145,926 A | | 9/1992 | Patel et al. | |
| 6,153,721 A | | 11/2000 | McCarthy et al. | |
| 11,008,444 B2 | * | 5/2021 | Ingratta | B60C 1/0025 |
| 2001/0053820 A1 | * | 12/2001 | Yeager | C08G 65/485 525/186 |
| 2003/0069384 A1 | * | 4/2003 | McCarthy | C08G 61/02 528/87 |

FOREIGN PATENT DOCUMENTS

| | | | |
|---|---|---|---|
| CN | 1298377 | A | 6/2001 |
| CN | 107108782 | A | 8/2017 |
| JP | 2007311732 | A | 11/2007 |
| JP | 2012018215 | A | 1/2012 |
| WO | 9943638 | A1 | 9/1999 |

OTHER PUBLICATIONS

Extended European Search Report with Written Opinion for European Application No. 21172123.8; International Filing Date May 4, 2021, Date of Mailing Oct. 19, 2021; 5 pages.

International Search Report and Written Opinion for PCT Application No. PCT/IB2022/054083; International Filing Date May 3, 2022, Date of Mailing Aug. 4, 2022; 7 pages.

Nuyken O. et al., "Cationic Polymerization of BIS(1-Alkylvinyl)Benzenes and Related Monomers, 5A) New Thermostable Polyindanes," Makromol. Chem and Physics, Wiley, (Jan. 1, 1992), vol. 193, pp. 487-500, http://dx.doi.org/10.1002/macp.1992.021930220.

Office Action for the corresponding Japanese Application No. 2023-566718, Date of Drafting: Dec. 10, 2024; 3 pages, English translation.

* cited by examiner

*Primary Examiner* — Randy P Gulakowski
*Assistant Examiner* — Holley Grace Hester
(74) *Attorney, Agent, or Firm* — Kimberly K. Vines, Esq.; Stites & Harbison, PLLC

(57) ABSTRACT

A capped polyindane oligomer of formula (1): (1) wherein $R^1$, $R^2$, and $R^3$ are each independently hydrogen, halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and $R^x$ and $R^y$ are as provided herein.

(1)

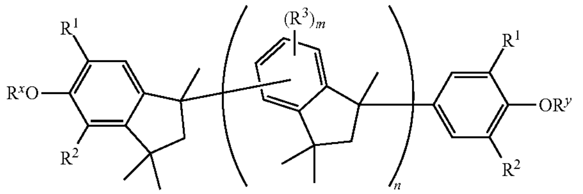

15 Claims, No Drawings

CAPPED BISPHENOL POLYINDANE OLIGOMER AND COMPOSITION, METHOD OF MANUFACTURE, AND ARTICLES MADE THEREFROM

CROSS REFERENCE TO RELATED APPLICATIONS

This application is a National Stage filing of International Application No. PCT/IB2022/054083, filed on May 3, 2022, which claims the benefit of European Patent Application No. 21172123.8, filed on May 4, 2021, both of which are incorporated by reference herein in their entirety.

BACKGROUND

This disclosure generally relates to functionalized polyindanes, and more particularly, to end-capped polyindanes oligomers, methods of manufacture, and uses thereof.

Thermoset resins can be used in a wide variety of consumer and industrial products such as protective coatings, adhesives, electronic laminates (such as those used in the fabrication of printed circuit boards), flooring and paving applications, glass fiber-reinforced pipes, and automotive parts (including leaf springs, pumps, and electrical components).

In some instances, thermosetting resin compositions can be prepared to include polymeric species having structural repeating units that supply a source of aliphatic carbon content to provide improved dielectric properties in the cured thermoset products. For example, polyether resins can be prepared from oligomers that are synthetically versatile and can be combined with thermosets resins, such as epoxies, cyanate esters, maleimides, acrylates, and benzoxazine resins.

The increasing demands of data storage and data transmission have increased the need for high density and multilayer printed circuit boards for electronics applications. As the complexity of the devices such as printed circuit boards increases, there is an increasing demand to accommodate the reduction in free design space caused by miniaturization and the emerging requirements of signal transmission and bandwidth through high performance materials.

There accordingly remains a need for materials with lower dielectric constant and dissipation factor.

SUMMARY

Provided is a capped polyindane oligomer of formula (1):

(1)

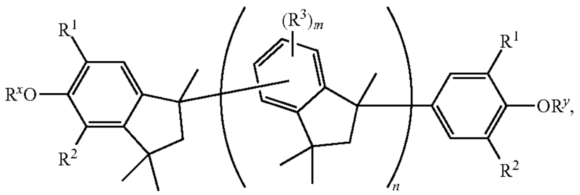

wherein $R^1$, $R^2$, and $R^3$ are each independently hydrogen, halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $R^x$ and $R^y$ are each independently a hydrogen atom or a group represented by:

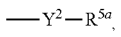

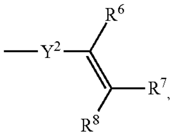

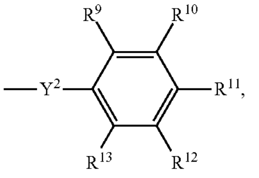

or

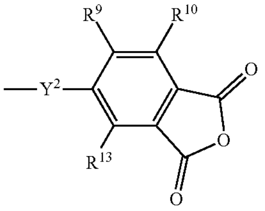

wherein $Y^2$ is a divalent linking group having one of formulas

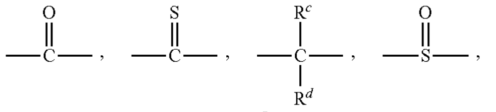

or

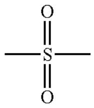

wherein each occurrence of $R^c$ and $R^d$ independently is hydrogen or $C_{1-12}$ alkyl, $R^{5a}$ is an epoxide-containing group, a cyanate-containing group, or a $C_{1-12}$ hydrocarbyl optionally substituted with one or two carboxylic acid groups, each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid, and each occurrence of $R^9$, $R^{10}$, $R^{11}$, $R^{12}$, and $R^{13}$ independently is hydrogen, halogen, $C_{1-12}$ alkyl, $C_{2-12}$ alkenyl, hydroxy, amino, maleimide, carboxylic acid, or a $C_{2-20}$ alkyl ester; provided that at least one of $R^x$ and $R^y$ is not a hydrogen atom; m is an integer of 0 to 3, preferably 0 to 2, more preferably 0 to 1; and n is an integer of 2 to 20, preferably 3 to 16.

Also provided herein is a method of manufacturing the capped polyindane oligomer comprising reacting a di(isopropenyl)benzene in the presence of an acid catalyst and a cracking product of a dihydric phenol.

Also provided herein are a curable thermosetting composition comprising the capped polyindane oligomer and an article derived from the curable thermosetting composition.

The above described and other features are exemplified by the following detailed description, examples, and claims.

DETAILED DESCRIPTION

The present disclosure relates to increasing the aliphatic content of aromatic polyether thermoset compositions to improve the dielectric performance and thermal properties of the corresponding cured thermoset products. The inventors have discovered low molecular weight bifunctional polyindane oligomers that achieve improved dielectric performance and have desirable thermal properties. The polyindane oligomers can be obtained, for example, via a polycondensation reaction of a di(isopropenyl)benzene and a cracking product of a dihydric phenol, for example isopropenyl phenol produced from cracking bisphenol A (BPA). The phenolic end groups of the bifunctional polyindane oligomers are derived from a monophenol product of the cracking reaction. The inventors have discovered that one or more of the phenolic end groups of the bifunctional polyindane oligomers can be further modified to include other reactive functionalities.

Provided herein is a capped polyindane oligomer including one or more reactive end groups. More particularly, provided is a capped polyindane oligomer of formula (1):

(1)

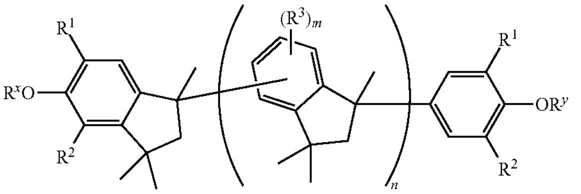

wherein m is an integer of 0 to 3, preferably 0 to 2, more preferably 0 to 1; and n is an integer of 2 to 20, preferably 3 to 16.

In formula (1) $R^1$, $R^2$, and $R^3$ are each independently hydrogen, halogen, $C_{1-12}$ hydrocarbyl provided that the hydrocarbyl group is not tertiary hydrocarbyl. $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. For example, each occurrence of $R^1$, $R^2$, and $R^3$ independently can be hydrogen, $C_{1-12}$ alkyl, $C_{2-12}$ alkenyl, or $C_{2-12}$ alkynyl. In a specific aspect, each occurrence of $R^1$, $R^2$, and $R^3$ independently can be hydrogen or $C_{1-12}$ primary alkyl, preferably hydrogen or $C_{1-6}$ primary alkyl. In some aspects. $R^3$ can be hydrogen, $C_{1-12}$ primary or secondary alkyl, or $C_{6-12}$ aryl.

In formula (1). $R^x$ and $R^y$ are each independently a hydrogen atom or a group represented by:

$—Y^2—R^{5a}$,

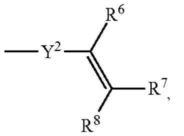

-continued

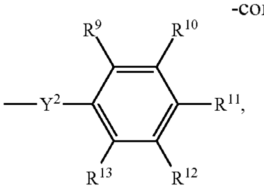

or

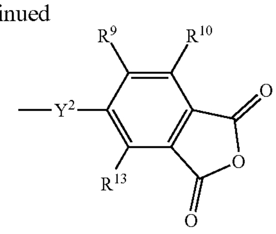

wherein $Y^2$ is a divalent linking group having one of formulas

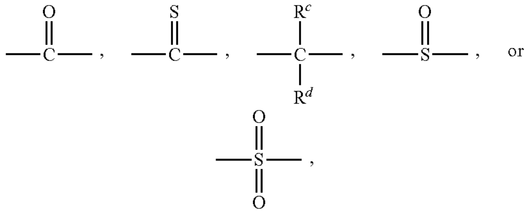

provided that at least one of $R^x$ and $R^y$ is not a hydrogen atom.

In formula (1), each occurrence of $R^c$ and $R^d$ independently is hydrogen or $C_{1-12}$ alkyl. $R^{5a}$ is an epoxide-containing group, a cyanate-containing group, or a $C_{1-12}$ hydrocarbyl optionally substituted with one or two carboxylic acid groups. Each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid. Each occurrence of $R^9$, $R^{10}$, $R^{11}$, $R^{12}$, and $R^{13}$ independently is hydrogen, halogen, $C_{1-12}$ alkyl, $C_{2-12}$ alkenyl, hydroxy, amino, maleimide, carboxylic acid, or a $C_{2-20}$ alkyl ester.

In some aspects, the capped polyindane oligomer can be an oligomer represented by formula (2):

(2)

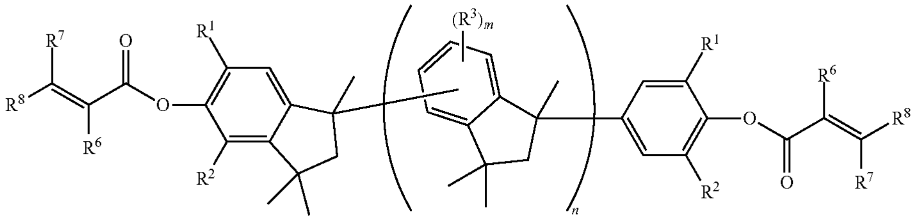

wherein $R^1$ to $R^3$, $R^6$ to $R^8$, m, and n are as defined in formula (1).

The capped polyindane oligomer can include an average of 1.1 to 2 reactive end groups per molecule. For example, the capped polyindane oligomer can include an average of 1.4 to 2 reactive end groups per molecule, or 1.8 to 2 reactive end groups per molecule, or 1.9 to 2 reactive end groups per molecule, about 2 reactive end groups per molecule, or 2 reactive end groups per molecule. As used herein, the term "reactive end group" refers to $R^x$ and $R^y$ in formula (1), wherein $R^x$ and $R^y$ are each independently not a hydrogen atom. Accordingly, $R^x$ is not considered a reactive end group when $R^x$ is a hydrogen atom. Similarly, $R^y$ is not considered a reactive end group when $R^y$ is a hydrogen atom.

The capped polyindane oligomer can have a weight average molecular weight ($M_w$) ranging from 450 to 200,000 Dalton (Da), or greater, as determined by gel permeation chromatography (GPC) using polystyrene standards. Preferably, the $M_w$ of the capped polyindane oligomers can be from 450 to 50,000 Da, and more preferably from 450 to 5,000 Da, as determined by GPC using polystyrene standards. In one preferred aspect, the $M_w$ can be from 600 to 2,500 Da, as determined by GPC using polystyrene standards.

The capped polyindane oligomer can have a glass transition temperature ($T_g$) from 80 to 240° C., preferably 80 to 200° C., more preferably 80 to 190° C., as determined by differential scanning calorimetiy (DSC).

As disclosed herein, the capped polyindane oligomer can be prepared or derived from a polycondensation reaction of a di(isopropenyl)benzene and a cracking product of a dihydric phenol, wherein the cracking product includes an allyl-substituted, more particular an isopropenyl-substituted, phenol. For example, bisphenol A can be cracked into a mixture of phenol and 2-isopropenyl phenol. The resulting mixture of phenol and 2-isopropenyl phenol can be directly copolymerized with diisopropenylbenzene in the presence of an organic solvent under acidic conditions, to yield a polyindane including a terminal phenol functionality. As used herein, the term "terminal phenol functionality" refers to an end group wherein $R^x$ and/or $R^y$, respectively, is a hydrogen atom.

An aspect provides a capped polyindane oligomer that is derived from polycondensation of a di(isopropenyl)benzene in the presence of an acid catalyst and a cracking product of a dihydric phenol. Also provided is a process for forming a capped polyindane oligomer, which includes copolymerizing a di(isopropenyl)benzene and a cracking product of a dihydric phenol in the presence of an acid catalyst. For example, a process for forming a capped polyindane oligomer can include cracking bisphenol A to form isopropenylphenol, and reacting 1,4-diisopropenylbenzene and isopropenylphenol in the presence of triflic acid.

The di(isopropenyl)benzene can be 1,2-diisopropenylbenzene, 1,3-diisopropenylbenzene, 1,4-diisopropenylbenzene, or a combination thereof. Preferably, the di(isopropenyl) benzene is 1,3-diisopropenylbenzene, 1,4-diisopropenylbenzene, or a combination thereof. More preferably, the di(isopropenyl)benzene is 1,3-diisopropenylbenzene.

The dihydric phenol can be a compound of formula (4):

(4)

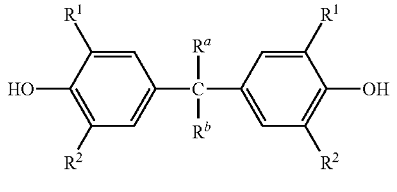

wherein $R^1$ and $R^2$ are the same as provided for formula (1); and $R^a$ and $R^b$ are each independently hydrogen, $C_{1-12}$ hydrocarbyl, or $C_{1-6}$ hydrocarbylene, provided that at least one of $R^a$ and $R^b$ is $C_{1-12}$ alkyl. In some aspects, $R^a$ and $R^b$ are each independently a $C_{1-12}$ alkyl, preferably a $C_{1-6}$ alkyl. In certain aspects, $R^a$ and $R^b$ are methyl.

For example, the dihydric phenol can be 1,1-bis(3,5-dimethyl-4-hydroxyphenyl) ethane, 1,1-bis(3-chloro-4-hydroxyphenyl)ethane, 1,1-bis(3-methyl-4-hydroxyphenyl)-ethane, 1,2-bis(4-hydroxy-3,5-dimethylphenyl)-1,2-diphenylethane, 1,2-bis(3-methyl-4-hydroxyphenyl) 1,2-diphenylethane, 1,2-bis(3-methyl-4-hydroxyphenyl)ethane, 2,2-bis(3,5-dichloro-4-hydroxyphenyl)propane, 2,2-bis(3-bromo-4-hydroxyphenyl)propane, 2,2-bis(3-phenyl-4-hydroxyphenyl)propane, 2,2-bis(3-methyl-4-hydroxyphenyl) propane, 2,2-bis(3,5-dimethyl-4-hydroxyphenyl)propane, tetrabromobisphenol, tetrabromobisphenol A, tetrabromobisphenol S, 2,2'-diallyl-4,4'-bisphenol A, 2,2'-diallyl-4,4'-bisphenol S, or a combination thereof.

The polymerization catalyst can be Lewis acid or a Bronsted acid. For example, the polymerization catalyst can be trifluoroacetic acid (TFA), $SnCl_4$, $BF_3$, $H_2SO_4$, or a combination thereof. Several alternatives to an acidic polymerization medium include, for example, art-known strong acid cationic ion exchange resins can be used, an example of which is NAFION (Aldrich Chemical Company, Milwaukee, Wis.), a sulfonic acid functionalized fluoropolymer. Other alternatives to an acidic polymerization medium include sulfonic acid functionalized styrene-divinylbenzene (H) ion exchange resins. Heterogeneous acidic bentonite clays can be used, for example, SUPER FILTROL F-I O (Engelhard Corporation, Jackson, Miss.). The heterogeneous catalysts have the advantage that they can be readily separated from the reaction mixture by filtration and can be reused repeatedly. In addition. Ziegler-type complexes can be used to conduct the polymerization reaction. These include, for example, LiBu-$TiCl_4$—HCl or $Al(Et)_3Ti(OBu)_4$-HCl, wherein Bu is butyl and Et is ethyl. In another aspect, the polymerization reaction can be conducted using two acid steps. The first step can be conducted in a polymerization medium that includes TFA. The TFA treatment can then be followed by a post treatment with sulfuric acid. This two-step process can be useful in avoiding products with incomplete indane ring closure and internal olefins along the polymer backbone when the polymerization is conducted at room temperature.

The reaction is generally carried out in an organic solvent. Suitable polymerization solvents include any solvent known in the art that effectively dissolves the reactants and supports the polymerization reaction. These include, for example, nitrobenzene, benzene, toluene, hexane, 1,2-dichloroethane, tetrachloroethane, tetrachloromethane, or the like, or a combination thereof. Preferred polymerization solvents include nitrobenzene and 1,2-dichloroethane.

As disclosed above, the capped polyindane oligomer is a functional oligomer having particular end groups, and the method of making the functionalized polyindane oligomer can further include reacting the hydroxy-terminated polyindane oligomer, such as the oligomer of formula (3), with a capping agent. For example, the process for forming the capped polyindane oligomer can further include reacting a capping agent and an uncapped polyindane oligomer comprising a phenolic end group under conditions effective to provide a reaction mixture including the capped polyindane oligomer.

In some aspects, the capped polyindane oligomer can be prepared by reacting a capping agent and an uncapped polyindane oligomer of formula (3):

(3)

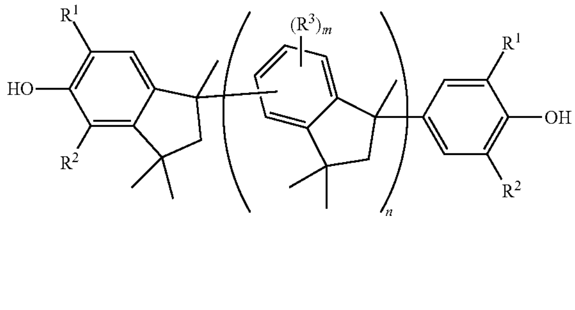

wherein $R^1$ to $R^3$, m, and n are as defined in formula (1).

The capping agent is not particularly limited, and can be a compound including unsaturation, an epoxy, a benzoxazine, an isocyanate, a cyanate ester, a melamine, a cyanophenyl, a maleimide, a phthalonitrile, a cycloalkylphenyl, an ethoxylate, a urethane, an anhydride, an allylhydroxypropyl, or the like, or a combination thereof. The person of skill in the art can determined the capping agent based on the desired functionality of the capped polyindane oligomer. For example, a vinyl benzyl ether end group can be prepared using a curing agent that is a vinyl benzyl halide (e.g., vinyl benzyl chloride), a (meth)acrylic end group can be prepared using a curing agent that is a (meth)acrylic acid halide or a (meth)acrylic anhydride.

The capping agent and the capped polyindane oligomer are reacted in a solvent. Exemplary solvents include, for example, aromatic hydrocarbons such as toluene or xylene, or chlorinated aromatic hydrocarbons such as chlorobenzene, o-dichlorobenzene, or 1,2,4-trichlorobenzene. In an aspect, the solvent is toluene.

In some aspects, the uncapped polyindane oligomer is obtained as an isolated product that is subsequently combined with the capping agent and a solvent. In other aspects, the uncapped the polyindane oligomer is obtained as a solution from the polymerization reaction without removing the solvent, and the uncapped polyindane oligomer is not isolated from the solvent solution.

A capping catalyst may be employed in the reaction of an uncapped polyindane oligomer with a capping agent. Examples of such compounds, including those known to the art, which are capable of catalyzing condensation of phenols with the capping agents described above. Useful materials are basic compounds including, for example, basic compound hydroxide salts such as sodium hydroxide, potassium hydroxide, tetraalkylammonium hydroxides, or the like; tertiary alkylamines such as tributyl amine, triethylamine, dimethylbenzylamine, dimethylbutylamine, or the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, or the like.

In one aspect, the capping catalyst is an organic amine catalyst. Preferred organic amine catalysts include, for example, tertiary alkylamines, tertiary mixed alkyl-aryl amines, heterocyclic amines, and the like. It will be understood that the organic amine catalyst includes ammonium ions formed by protonation of the organic amine. In one aspect, the capping catalyst comprises a 4-dialkylaminopyridine, for example 4-dimethylaminopyridine (DMAP).

Alternatively, the capping catalyst can be a transesterification catalyst. Any suitable transesterification catalyst that is capable of catalyzing transesterification of phenols with the capping agents described above may be used. For example, the capping catalyst can be alpha catalysts that comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of carbonate, such as $Cs_2CO_3$, $NaHCO_3$, and $Na_2CO_3$, or the like, non-volatile inorganic acid such as $NaH_2PO_3$, $NaH_2PO_4$, $Na_2HPO_3$, $KH_2PO_4$, $CsH_2PO_4$, $Cs_2HPO_4$, or the like, or mixed salts of phosphoric acid, such as $NaKHPO_4$, $CsNaHPO_4$, $CsKHPO_4$, or the like. Combinations comprising at least one of any of the foregoing catalysts can be used.

The capping catalyst may alternatively be a beta transesterification catalyst that comprises a quaternary ammonium compound, a quaternary phosphonium compound, or a combination comprising at least one of the foregoing. The quaternary ammonium compound can be a compound of the structure $(R^{14})_4N^+X^-$, wherein each $R^{14}$ is the same or different, and is a $C_1$-$C_{20}$ alkyl, a $C_4$-$C_{20}$ cycloalkyl, or a $C_4$-$C_{20}$ aryl; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^{15})_4P^+X^-$, wherein each $R^{15}$ is the same or different, and is a $C_1$-$C_{20}$ alkyl, a $C_4$-$C_{20}$ cycloalkyl, or a $C_4$-$C_{20}$ aryl; and $X^-$ is an organic or inorganic anion, for example a hydroxide, phenoxide, halide, carboxylate such as acetate or formate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{14}$ or $R^{15}$ are each methyl and $X^-$ is carbonate, it is understood that $X^-$ represents ½$(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The process can further include isolating the capped polyindane oligomer from the reaction mixture. Suitable methods include precipitation and total isolation methods. As part of the total isolation, a portion of the solvent is preferably removed to reduce the solvent load on the total isolation equipment. The isolated capped polyindane oligomer can further be dried at elevated temperatures, for example at 80° C. to 160° C. preferably at 100° C. to 140° C. for 6 to 24 hours, preferably 8 to 16 hours.

The capped polyindane oligomer can also be a part of a composition that may include a blend of at least two capped polyindane oligomers. Such blends may be prepared from individually prepared and isolated capped polyindane oligomers. Alternatively, such blends may be prepared by reacting a single uncapped polyindane oligomer with at least two different capping agents.

The capped polyindane oligomer may be suited as a reactive component in a curable composition comprising a thermosetting resin. Also provided is a curable thermosetting composition including the capped polyindane oligomer. For example, the capped polyindane oligomer can be present in the curable thermosetting composition in an amount of 1 to 95 weight percent (wt %), or 5 to 95 wt %, or 10 to 85 wt %, or 20 to 80 wt %, 30 to 70 wt %, or 5 to 30 wt %, or 5 to 15 wt %, based on the total weight of the curable thermosetting composition.

The curable thermosetting composition can further include one or more of a crosslinking agent, a curing agent, a curing catalyst, a curing initiator, or a combination thereof. In some aspects, the curable thermosetting composition can further include one or more of a flame retardant, a filler, a coupling agent, or a combination thereof. For example, the curable thermosetting composition can include one or more of a crosslinking agent, a curing agent, a curing catalyst, a curing initiator, or a combination thereof; and can further include one or more of a flame retardant, a filler, a coupling agent, or a combination thereof.

There is considerable overlap among thermosetting resins, crosslinking agents, and coupling agents. As used herein, the term “crosslinking agent” includes compounds that can be used as thermosetting resins, crosslinkers, coupling agents, or a combination thereof. For example, in some instances a compound that is a thermosetting resin could also be used as a crosslinking agent, a coupling agent, or both.

The thermosetting resins are not particularly limited, and thermosetting resins can be used alone or in combinations of two or more thermosetting resins (e.g., including one or more auxiliary thermosetting resins). Exemplary thermosetting resins include epoxy resins, cyanate ester resins, (bis) maleimide resins, (poly)benzoxazine resins, vinyl resins (e.g., a vinyl benzyl ether resin), phenolic resins, alkyd resins, unsaturated polyester resins, arylcyclobutene resins, perfluorovinyl ether resins, monomers, oligomers or polymers with curable unsaturation (e.g., a vinyl functionality), or the like, or a combination thereof.

The epoxy resin can be any epoxy resin that is suitable for use in thermosetting resins. The term “epoxy resin” in this context refers to a curable composition of oxirane ring-containing compounds as described in, for example, C. A. May, Epoxy Resins, 2.sup.nd Edition, (New York & Basle: Marcel Dekker Inc.), 1988. The epoxy resins can include bisphenol A type epoxy resins such as those obtained from bisphenol A and resins obtained by substituting at least one position of the 2-position, the 3-position and the 5-position of bisphenol A with a halogen atom, an alkyl group having 6 or less carbon atoms or a phenyl group; bisphenol F type epoxy resins such as those obtained from bisphenol F and a resin obtained by substituting at least one position of the 2-position, the 3-position and the 5-position of bisphenol F with a halogen atom, an alkyl group having 6 or less carbon atoms or a phenyl group; glycidyl ether compounds derived from bivalent or tri- or more-valent phenols such as hydroquinone, resorcinol, tris-4-(hydroxyphenyl)methane and 1,1,2,2-tetrakis(4-hydroxyphenyl)ethane; a novolak type epoxy resin derived from a novolak resin which is a reaction product between phenols such as phenol and o-cresol and formaldehyde, including bisphenol A novolak type epoxy resins and cresol novolak type epoxy resins; cyclic aliphatic epoxy compounds such as 2,2-bis(3,4-epoxycyclohexyl) propane, 2,2-bis[4-(2,3-epoxypropyl)cyclohexyl]propane, vinylcyclohexene dioxide, 3,4-epoxycyclohexylmethyl-3,4-epoxycyclohexane carboxylate; dicyclopentadiene-containing polyepoxides; amine type epoxy resins derived from aniline, p-aminophenol, m-aminophenol, 4-amino-m-cresol, 6-amino-m-cresol, 4,4'-diaminodiphenyl-ethane, 3,3'-diaminodiphenylmethane, 4,4'-diaminodiphenyl ether, 3,4'-diaminodiphenylether, 1,4-bis(4-aminophenoxy)benzene, 1,4-bis(3-aminophenoxy)-benzene, 1,3-bis(4-aminophenoxy)-benzene, 1,3-bis(3-aminophenoxy)benzene, 2,2-bis(4-amino-phenoxyphenyl)propane, p-phenylenediamine, m-phenylenediamine, 2,4-toluenediamine, 2,6-toluenediamine, p-xylylene-diamine, m-xylylenediamine, 1,4-cyclohexane-bis(methylamine), 5-amino-1-(4'-aminophenyl)-1,3,3-trimethylindane, 6-amino-1-(4'-aminophenyl)-1,3,3-trimethyl-indane or the like; hetero-cyclic epoxy compounds, and glycidyl ester type epoxy compounds, for example, those derived from glycidyl ester of aromatic carboxylic acids such as p-oxybenzoic acid, m-oxybenzoic acid, terephthalic acid, and isophthalic acid. An “epoxy resin” can also include reaction products of compounds containing two or more epoxy groups and aromatic dihydroxy compounds, which can be optionally halogen-substituted and can be used alone or in a combination of two or more.

Cyanate esters are not limited, and any resin composed of cyanate ester monomers, which polymerize to form a polymer containing a plurality of cyanate ester (—OCN) functional groups can be used. Cyanate ester monomers, prepolymers (i.e., partially polymerized cyanate ester monomers or blends of cyanate ester monomers), homopolymers, and copolymers made using cyanate ester precursors, and combinations of these compounds. For example, cyanate esters can be prepared according to methods as disclosed in “Chemistry and Technology of Cyanate Ester Resins,” by Ian Hamerton, Blackie Academic and Professional; U.S. Pat. No. 3,553,244, and JP-A-7-53497. Exemplary cyanate ester resins include 2,2-bis(4-cyanatophenyl)-propane, bis(4-cyanatophenyl)ethane, bis(3,5-dimethyl-4-cyanatophenyl)methane, 2,2-bis(4-cyanatophenyl)-1,1,1,3,3,3-hexafluoropropane, α,α'-bis(4-cyanatophenyl)-m-diisopropyl-benzene, cyanate ester resins prepared from dicyclopentadiene-phenol copolymers, and prepolymers prepared from these monomers. An example of a prepolymer is PRIMASET BA-230S (Lonza). The cyanate ester prepolymers can be homopolymers or can be copolymers that incorporate other monomers. Examples of such copolymers include BT resins available from Mitsubishi Gas Chemical, such as, BT 2160 and BT2170, which are prepolymers made with cyanate ester monomers and bismaleimide monomers. Other cyanate esters polymers, monomers, prepolymers, and blends of cyanate ester monomers with other non-cyanate ester monomers are disclosed in U.S. Pat. Nos. 7,393,904, 7,388,057, 7,276,563, and 7,192,651.

Bismaleimide resins can be produced by reaction of a monomeric bismaleimide with a nucleophile such as a diamine, aminophenol, or amino benzhydrazide, or by reaction of a bismaleimide with diallyl bisphenol A. Exemplary bismaleimide resins include 1,2-bismaleimidoethane, 1,6-bismaleimidohexane, 1,3-bismaleimidobenzene, 1,4-bismaleimido-benzene, 2,4-bismaleimidotoluene, 4,4'-bismaleimidodiphenylmethane, 4,4'-bismaleimido-diphenylether, 3,3'-bismaleimidodiphenylsulfone, 4,4'-bismaleimido-diphenylsulfone, 4,4'-bismaleimidodicyclohexylmethane, 3,5-bis(4-maleimidophenyl)pyridine, 2,6-bismaleimido-pyridine, 1,3-bis(maleimidomethyl)cyclohexane, 1,3-bis (maleimidomethyl)benzene, 1,1-bis(4-maleimidophenyl) cyclohexane, 1,3-bis(dichloromaleimido)benzene, 4,4'-bis (citracon-imido)diphenylmethane, 2,2-bis(4-maleimidophenyl)propane, 1-phenyl-1,1-bis(4-maleimido-phenyl)ethane, N,N-bis(4-maleimidophenyl)toluene, 3,5-bismaleimido-1,2,4-triazole N,N'-ethylenebismaleimide, N,N'-hexamethylenebismaleimide, N,N'-m-phenylene-bismaleimide, N,N'-p-phenylenebismaleimide, N,N'-4,4'-diphenylmethanebismaleimide, N,N'-4,4'-diphenyl-etherbismaleimide, N,N'-4,4'-diphenylsufonebismaleimide, N,N'-4,4'-dicyclohexylmethane-bismaleimide, N,N'-α,α-4,4'- dimethylenecyclohexanebismaleimide, N,N'-m-methaxylene-bismaleimide, N,N'-4,4'-diphenylcyclohexanebismaleimide, and N,N'-methylene-bis (3-chloro-p-phenylene)bismaleimide, as well as those disclosed in U.S. Pat. Nos. 3,562,223; 4,211,860; and 4,211,861, or as prepared by methods as described, for example, in U.S. Pat. No. 3,018,290.

The benzoxazine compounds have a benzoxazine ring in the molecule. Exemplary benzoxazine monomers can be prepared from the reaction of aldehydes, phenols, and primary amines with or without solvent. The phenolic compounds for forming benzoxazines include phenols and polyphenols. The use of polyphenols with two or more hydroxyl groups reactive in forming benzoxazines can result in branched, crosslinked, or a combination of branched and crosslinked products. The groups connecting the phenolic groups into a phenol can be branch points or connecting groups in the polybenzoxazine.

Exemplary phenols for use in the preparation of benzoxazine monomers include phenol, cresol, resorcinol, catechol, hydroquinone, 2-allylphenol, 3-allylphenol, 4-allylphenol, 2,6-dihydroxynaphthalene, 2,7-dihydrooxynapthalene, 2-(diphenyl-phosphoryl) hydroquinone, 2,2'-biphenol, 4,4-biphenol, 4,4'-isopropylidenediphenol, 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)-bisphenol, 4,4'-ethylidenediphenol, 4,4'-oxydiphenol, 4,4'-thiodiphenol, 4,4'-sufonyldiphenol, 4,4'-sulfinyldiphenol, 4,4'-hexafluoroisopropylidene)bisphenol, 4,4'(1-phenylethylidene)-bisphenol, bis(4-hydroxyphenyl)-2,2-dichloroethylene, bis(4-hydroxyphenyl)methane, 4,4'-(cyclopentylidene)diphenol, 4,4'-(cyclohexylidene)diphenol, 4,4'-(cyclododecylidene)diphenol 4,4'-(bicyclo[2.2.1]heptylidene)diphenol, 4,4'-(9H-fluorene-9,9-diyl)diphenol, isopropylidene-bis(2-allylphenol), 3,3-bis(4-hydroxyphenyl)isobenzofuran-1(3H)-one, 1-(4-hydroxyphenyl)-3,3-dimethyl-2,3-dihydro-1H-inden-5-ol, 3,3,3',3'-tetramethyl-2,2',3,3'-tetrahydro-1,1'-spirobi-[indene] 5,6'-diol, dihydroxybenzophenone, tris(4-hydroxyphenyl)methane, tris(4-hydroxy-phenyl)ethane, tris(4-hydroxyphenyl)propane, tris(4-hydroxyphenyl)butane, tris (3-methyl-4-hydroxyphenyl)methane, tetrakis(4-hydroxyphenyl)ethane dicyclopentadienylbis(2,6-dimethyl phenol), dicyclopentadienyl bis(ortho-cresol), dicyclopentadienyl bisphenol, or the like.

The aldehydes used to form the benzoxazine can be any aldehyde, such as an aldehyde having 1 to 10 carbon atoms. For example, the aldehyde can be formaldehyde. The amine used to form the benzoxazine can be an aromatic amine, an aliphatic amine, an alkyl substituted aromatic, or an aromatic substituted alkyl amine. The amine can be a polyamine, for example to prepare polyfunctional benzoxazine monomers for crosslinking.

The amines for forming benzoxazines have 1 to 40 carbon atoms unless they include aromatic rings, and then they can have 6 to 40 carbon atoms. The amine of di- or polyfunctional can be a branch point to connect one polybenzoxazine to another.

In some examples, thermal polymerization at 150 to 300° C. can be used for polymerizing benzoxazine monomers. The polymerization can be done in bulk, from solution, or otherwise. Catalysts, such as carboxylic acids, can be used to reduce the polymerization temperature or accelerate the polymerization rate at the same temperature.

Vinyl benzyl ether resins can be prepared from condensation of a phenol with a vinyl benzyl halide, such as vinyl benzyl chloride. Bisphenol-A and trisphenols and polyphenols are generally used to produce poly(vinylbenzyl ethers) which can be used to produce crosslinked thermosetting resins. Exemplary vinyl benzyl ethers can include those vinylbenzyl ethers produced from reaction of a vinylbenzyl halide with resorcinol, catechol, hydroquinone, 2,6-dihydroxynaphthalene, 2,7-dihydroxynaphthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-iso-propylidenediphenol, 4,4'-isopropylidenebis(2,6-dibromophenol), 4,4'-isopropylidenebis(2,6-dimethylphenol) (teramethylbisphenol A), 4,4'-isopropylidenebis(2-methylphenol), 4,4'-ispropylidenebis(2-allylphenol), 4,4'(1,3-phenylenediisopropylidene)bisphenol, 4,4'-isopropyli-denebis(3-phenylphenol) 4,4'-(1,4-phenylenediisoproylidene) bisphenol, 4,4'-ethylidenedi-phenol, 4,4'-oxydiphenol, 4,4'-thiodiphenol, 4,4'-thiobis(2,6-dimethylphenol), 4,4'-sufonyldi-phenol, 4,4'-sulfonylbis(2,6-dimethylphenol) 4,4'-sulfinyl-diphenol, 4,4'-hexafluoroisopropyli-dene) bisphenol, 4,4'(1-phenylethylidene) bisphenol, bis(4-hydroxyphenyl)-2,2-dichloro-ethylene, bis(4-hydroxyphenyl)methane, bis(2,6-dimethyl-4-hydroxyphenyl) methane, 4,4'-(cyclopentylidene)diphenol, 4,4'-(cyclohexylidene)diphenol, 4,4'-(cycloidecylidene)diphenol 4,4'-(bicyclo [2.2.1]heptylidene)diphenol, 4,4'-(9H-fluorene-9,9-diyl)diphenol, 3,3-bis(4-hydroxyphenyl)-isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol, dihydroxybenzo-phenone, tris(4-hydroxyphenyl) methane, tris(4-hydroxyphenyl)ethane, tris(4-hydroxyphenyl)-propane, tris(4-hydroxyphenyl)butane, tris (3-methyl-4-hydroxyphenyl)methane, tris(3,5-dimethyl-4-hydroxy-phenyl)methane, tetrakis(4-hydroxyphenyl)ethane, tetrakis(3,5-dimethyl-4-hydroxyphenyl)-ethane, bis(4-hydroxyphenyl)phenylphosphine oxide, dicyclopentadienylbis(2,6-dimethyl phenol), dicyclopentadienyl bisphenol, or the like.

Arylcyclobutenes include those derived from compounds of the structure

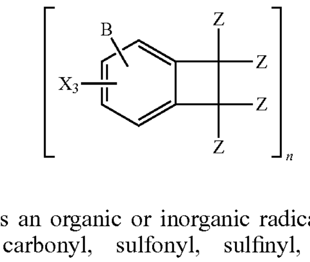

wherein B is an organic or inorganic radical of valence n (including carbonyl, sulfonyl, sulfinyl, sulfide, oxy, alkylphosphonyl, arylphosphonyl, isoalkylidene, cycloalkylidene, arylalkylidene, diarylmethylidene, methylidene dialkylsilanyl, arylalkylsilanyl, diarylsilanyl and $C_{6-20}$ phenolic compounds); each occurrence of X is independently hydroxy or $C_{1-24}$ hydrocarbyl (including linear and branched alkyl and cycloalkyl); and each occurrence of Z is independently hydrogen, halogen, or $C_{1-12}$ hydrocarbyl; and n is 1 to 1000, or 1 to 8, or n is 2, 3, or 4. Other exemplary arylcyclobutenes and methods of arylcyclobutene synthesis can be found in U.S. Pat. Nos. 4,743,399, 4,540,763, 4,642, 329, 4,661,193, 4,724,260, and 5,391,650.

Perfluorovinyl ethers are typically synthesized from phenols and bromotetrafluoroethane followed by zinc catalyzed reductive elimination producing ZnFBr and the desired perfluorovinylether. By this route bis, tris, and other polyphenols can produce bis-, tris- and poly(perfluorovinylether) s. Phenols useful in their synthesis include resorcinol, catechol, hydroquinone, 2,6-dihydroxy naphthalene, 2,7-dihydroxynapthalene, 2-(diphenyl-phosphoryl) hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol), 4,4'-isopropylidenebis(2,6-dimethylphenol), 4,4'-isopropylidenebis(2-methylphenol), 4,4'-isopropylidenebis(2-allylphenol), 4,4'(1,3-phenylenediisopropylidene)-bisphenol, 4,4'-isopropylidenebis(3-phenylphenol) 4,4'-(1, 4-phenylenediisoproylidene)-bisphenol, 4,4'-ethylidenediphenol, 4,4'oxydiphenol, 4,4'thiodiphenol, 4,4'thiobis(2,6-dimethylphenol), 4,4'-sufonyldiphenol, 4,4'-sulfonylbis(2,6-dimethylphenol) 4,4'-sulfinyldiphenol, 4,4'-hexafluoroisoproylidene)bisphenol, 4,4'(1-phenylethylidene)-bisphenol, bis(4-hydroxyphenyl)-2,2-dichloroethylene, bis(4-hydroxyphenyl)-methane, bis(2,6-dimethyl-4-hydroxyphenyl)methane, 4,4'-(cyclopentylidene)diphenol, 4,4'-(cyclohexylidene) diphenol, 4,4'-(cyclododecylidene)diphenol 4,4'-(bicyclo [2.2.1]heptylidene)-diphenol, 4,4'-(9H-fluorene-9,9-diyl) diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2'3,3'-tetrahydro-1,1'-spirobi[indene]-5,6'-diol (Spirobiindane), dihydroxybenzophenone, tris(4-hydroxyphenyl)methane, tris(4-hydroxyphenyl)ethane, tris (4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)-phenylphosphine oxide, dicyclopentadienylbis(2,6-dimethyl phenol), dicyclopentadienyl bis(2-methylphenol), dicyclopentadienyl bisphenol, or the like.

The crosslinking agents, which also include auxiliary crosslinking agents, are not particularly limited. The crosslinking agents can be used alone or in combinations of two or more different crosslinking agents. Exemplary crosslinking agents and auxiliary crosslinking agents include oligomers or polymers with curable vinyl functionality. Such materials include oligomers and polymers having crosslinkable unsaturation. Examples include styrene butadiene rubber (SBR), butadiene rubber (BR), and nitrile butadiene rubber (NBR) having unsaturated bonding based on butadiene; natural rubber (NR), isoprene rubber (IR), chloroprene rubber (CR), butyl rubber (IIR), and halogenated butyl rubber having unsaturated bonding based on isoprene; ethylene-α-olefin copolymer elastomers having unsaturated bonding based on dicyclopentadiene (DCPD), ethylidene norbornene (ENB), or 1,4-dihexadiene (1,4-HD) (e.g., ethylene-α-olefin copolymers obtained by copolymerizing ethylene, an α-olefin, and a diene, such as ethylene-propylene-diene terpolymer (EPDM) and ethylene-butene-diene terpolymer (EBDM)). Examples also include hydrogenated nitrile rubber, fluorocarbon rubbers such as vinylidenefluoride-hexafluoropropene copolymer and vinylidenefluoride-pentafluoropropene copolymer, epichlorohydrin homopolymer (CO), copolymer rubber (ECO) prepared from epichlorohydrin and ethylene oxide, epichlorohydrin allyl glycidyl copolymer, propylene oxide allyl glycidyl ether copolymer, propylene oxide epichlorohydrin allyl glycidyl ether terpolymer, acrylic rubber (ACM), urethane rubber (U), silicone rubber (Q), chlorosulfonated polyethylene rubber (CSM), polysulfide rubber (T) and ethylene acrylic rubber. Further examples include various liquid rubbers, for example several types of liquid butadiene rubbers, and the liquid atactic butadiene rubber that is butadiene polymer with 1,2-vinyl connection prepared by anionic living polymerization. It is also possible to use liquid styrene butadiene rubber, liquid nitrile butadiene rubber (CTBN, VTBN, ATBN, etc. by Ube Industries, Ltd.), liquid chloroprene rubber, liquid polyisoprene, dicyclopentadiene type hydrocarbon polymer, and polynorbornene (for example, as sold by Elf Atochem).

Polybutadiene resins containing elevated levels of 1,2 addition are desirable for thermosetting matrices. Examples include the functionalized polybutadienes and poly(butadiene-styrene) random copolymers sold by Ricon Resins, Inc. under the trade names RICON, RICACRYL, and RICOBOND resins. These include butadienes containing both low vinyl content such as RICON 130, 131, 134, 142; polybutadienes containing high vinyl content such as RICON 150, 152, 153, 154, 156, 157, and P30D; random copolymers of styrene and butadiene including RICON 100, 181, 184, and maleic anhydride grafted polybutadienes and the alcohol condensates derived therefrom such as RICON 130MA8, RICON MA13, RICON 130MA20, RICON 131MAS, RICON 131MA10, RICON MA17. RICON MA20, RICON 184MA6 and RICON 156MA17. Also included are polybutadienes that can be used to improve adhesion including RICOBOND 1031, RICOBOND 1731. RICOBOND 2031, RICACRYL 3500, RICOBOND 1756. RICACRYL 3500; the polybutadienes RICON 104 (25% polybutadiene in heptane), RICON 257 (35% polybutadiene in styrene), and RICON 257 (35% polybutadiene in styrene); (meth)acrylic functionalized polybutadienes such as polybutadiene diacrylates and polybutadiene dimethacrylates. These materials are sold under the tradenames RICACRYL 3100, RICACRYL 3500, and RICACRYL 3801. Also are included are powder dispersions of functional polybutadiene derivatives including, for example, RICON 150D, 152D, 153D, 154D, P30D, RICOBOND 0 1731 HS, and RICOBOND 1756HS. Further butadiene resins include poly(butadiene-isoprene) block and random copolymers, such as those with molecular weights from 3,000 to 50,000 g/mol and polybutadiene homopolymers having molecular weights from 3.000 to 50.000 g/mol. Also included are polybutadiene, polyisoprene, and polybutadiene-isoprene copolymers functionalized with maleic anhydride functions, 2-hydroxyethylmaleic functions, or hydroxylated functionality.

Further examples of oligomers and polymers with curable vinyl functionality include unsaturated polyester resins based on maleic anhydride, fumaric acid, itaconic acid and citraconic acid; unsaturated epoxy (meth)acrylate resins containing acryloyl groups, or methacryloyl group; unsaturated epoxy resins containing vinyl or allyl groups, urethane (meth)acrylate resin, polyether (meth)acrylate resin, polyalcohol (meth)acrylate resins, alkyd acrylate resin, polyester acrylate resin, spiroacetal acrylate resin, diallyl phthalate resin, diallyl tetrabromophthalate resin, diethyleneglycol bisallylcarbonate resin, and polyethylene polythiol resins.

For example, the crosslinking agent. Other exemplary crosslinking agents further include polyfunctional crosslinking monomers such as (meth)acrylate monomers having two or more (meth)acrylate moieties per monomer molecule. Exemplary polyfunctional monomers include di(meth)acrylates such as 1,6-hexanediol di(meth)acrylate, 1,4-cyclohexanediol di(meth)acrylate, tripropylene glycol di(meth) acrylate, neopentyl glycol di(meth)acrylate, neopentyl glycol propoxylate di(meth)acrylate, neopentyl glycol ethoxylate di(meth)acrylate, neopentyl glycol propoxylate di(meth)acrylate, neopentyl glycol ethoxylate di(meth)acrylate, polyethylene glycol di(meth)acrylate, glycerol di(meth) acrylate, or the like; tri(meth)acrylates such as trimethylolpropane tri(meth)acrylate, 1,2,4-butanetriol tri(meth) acrylate, trimethylolpropane ethoxylate tri(meth)acrylate, or the like; tri(meth)allyls such as tri(meth)allyl cyanurate, tri(meth)allyl isocyanurate, tri(meth)allyl esters of citric acid, tri(meth)allyl esters of phosphoric acid, pentaerythritol tri(meth)acrylate, tris(hydroxyethyl)isocyanurate tri(meth) acrylate, or the like; tetra(meth)acrylates such as pentaerythritol tetra(meth)acrylate or the like; penta(meth)acrylates such as dipentaerythritol penta(meth)acrylate, or the like; hexa(meth)acrylates such as dipentaerythritol hexa(meth) acrylate, sorbitol hexa(meth)acrylate, or the like; glycidyl compounds such as glycidyl (meth)acrylate, (meth)allyl glycidyl ether, 1-chloro-2,3-epoxypropyl (meth)acrylate, 2-bromo-3,4-epoxybutyl (meth)acrylate, 2-(epoxyethyloxy)-ethyl (meth)acrylate, 2-(3,4-epoxybutyloxy)-ethyl (meth)acrylate, or the like; polythiol compounds such as trimethylolpropane tris(mercaptopropionate), pentaerythritol tetrakis(3-mercaptopropionate), or the like; silanes such as tetramethoxysilane, tetraethoxysilane, tetrapropoxysilane, tetra-n-butoxysilane, vinyltris(methylethyloximino)silane, vinyltris-(acetoxime)silane, methyltris(methylethyloximino)silane, methyltris(acetoxime)silane, vinyltrimethoxysilane, methyltrimethoxysilane, vinyltris (isopropenoxy)silane, tetraacetoxy-silane, methyltriacetoxysilane, ethyltriacetoxysilane, vinyltriacetoxysilane, di-t-butoxy-diacetoxysilane, methyltris(ethyl lactate)silane, vinyltris(ethyl lactate)silane, or the like; carbodiimides such as N-(3-dimethylaminopropyl)-N'-ethylcarbodiimide hydrochloride, dicyclohexylcarbodiimide, or the like; or a combination thereof. The curable thermosetting composition can optionally include a crosslinking catalyst, such as a carboxylic acid salt.

When the curable thermosetting composition includes a crosslinking agent, the crosslinking agent can be included in an amount of 1 to 60 wt %, or 5 to 50 wt %, or 10 to 40 wt %, based on total weight of the curable thermosetting composition.

The curable thermosetting composition can include one or more curing agents. As used herein, the term “curing agent” includes compounds that are variously described as curing agents, hardeners, or the like, or as both.

Exemplary curing agents and hardeners include amines, alcohols, phenols, carboxylic acids, acid anhydrides, and the like. For example, phenolic hardeners include novolac type phenol resins, resole type phenol resins, cresol novolac resins, aralkyl type phenol resins, phenol aralkyl resins, cresol aralkyl resins, naphthol aralkyl resins, dicyclopentadiene type phenol resins, terpene modified phenol resins, biphenyl type phenol resins, biphenyl-modified phenol aralkyl resins, bisphenols, triphenylmethane type phenol resins, tetraphenylol ethane resins, naphthol novolac resins, naphthol-phenol co-condensed novolac resins, naphthol-cresol co-condensed novolac resins, amino triazine modified phenol resins, or a combination thereof. Examples of the anhydride hardeners include methylhexahydrophthalic anhydride (MHHPA), methyltetrahydrophthalic anhydride, styrene-maleic anhydride copolymers (SMA), and olefin-maleic anhydride copolymers such as maleic anhydride grafted polyethylene, maleic anhydride grafted polypropylene, or a combination thereof. Other curing agents and hardeners include compounds such as dicyandiamides, polyamides, amidoamines, phenalkamines, Mannich bases, anhydrides, phenol-formaldehyde resins, amine-formaldehyde resins, phenol-formaldehyde resins, carboxylic acid functional polyesters, polysulfides, polymercaptans, isocyanates, cyanate ester compounds, or any combination thereof. Other exemplary curing agents include tertiary amines, Lewis acids, and oligomers or polymers with unsaturation.

When the curable thermosetting composition includes a curing agent, the curing agent can be included in an amount of 0.01 to 50 wt %, or 0.1 to 30 wt %, or 0.1 to 20 wt %, based on total weight of the curable thermosetting composition.

The curable thermosetting composition can include a curing catalyst. As used herein, the term “curing catalyst” includes compounds that are variously described as curing accelerators, curing promoters, curing catalysts, and curing co-catalysts.

Exemplary curing accelerators include heterocyclic accelerators such as a substituted or unsubstituted $C_{3-6}$ heterocycle comprising 1 to 4 ring heteroatoms, wherein each heteroatom is independently the same or different, and is nitrogen, oxygen, phosphorus, silicon, or sulfur. Heterocyclic accelerators include benzotriazoles; triazines; piperazines such as aminoethylpiperazine, N-(3-aminopropyl)piperazine, or the like; imidazoles such as 1-methylimidazole, 2-methylimidazole, 3-methyl imidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole; cyclic amidine such as 4-diazabicyclo(2,2,2)octane, diazabicycloundecene, 2-phenyl imidazoline, or the like; N,N-dimethylaminopyridine; a sulfamidate; or a combination thereof.

Amine curing accelerators include isophoronediamine, triethylenetetraamine, diethylenetriamine, 1,2- and 1,3-diaminopropane, 2,2-dimethylpropylenediamine, 1,4-diaminobutane, 1,6-diaminohexane, 1,7-diaminoheptane, 1,8-diaminooctane, 1,9-diaminononane, 1,12-diaminododecane, 4-azaheptamethylenediamine, N,N'-bis(3-aminopropyl)butane-1,4-diamine, dicyanamide, diamide diphenylmethane, diamide diphenylsulfonic acid (amine adduct), 4,4'-methylenedianiline, diethyltoluenediamine, m-phenylenediamine, p-phenylenediamine, melamine formaldehyde resins, urea formaldehyde resins, tetraethylenepentamine, 3-diethylaminopropylamine, 3,3'-iminobispropylamine, 2,4-bis(p-aminobenzyl)aniline, tetraethylenepentamine, 3-diethylaminopropylamine, 2,2,4- and 2,4,4-trimethylhexamethvlenediamine, 1,2- and 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diminocyclohexane, 4,4'-diaminondicyclohexylmethane, 4,4'-diaminodicyclohexylpropane, 2,2-bis(4-aminocyclohexyl)propane, 3,3'-dimethyl-4,4'-diaminodicyclohexylmethane, 3-amino-1-cyclohexaneaminopropane, 1,3- and 1,4-bis(aminomethyl) cyclohexane, m- and p-xylylenediamine, or diethyl toluene diamines; or a tertiary amine hardening accelerator such as triethylamine, tributylamine, dimethylaniline, diethylaniline, benzyldimethylamine (BDMA), α-methylbenzyldimethylamine, N,N-dimethyl amino pyridine, N,N-dimethylaminoethanol, N,N-dimethylaminocresol, or tri(N,N-dimethylaminomethyl)phenol; or a combination thereof.

The curing accelerator can be a latent cationic cure catalyst including, for example, diaryliodonium salts, phosphonic acid esters, sulfonic acid esters, carboxylic acid esters, phosphonic ylides, triarylsulfonium salts, benzylsulfonium salts, aryldiazonium salts, benzylpyridinium salts, benzylammonium salts, isoxazolium salts, or the like, or a combination thereof. The diaryliodonium salt can have the structure $[(R^{10})(R^{11})I]^+X^-$, wherein $R^{10}$ and $R^{11}$ are each independently a $C_{6-14}$ monovalent aromatic hydrocarbon radical, optionally substituted with from 1 to 4 monovalent radicals selected from $C_{1-20}$ alkyl, $C_{1-20}$ alkoxy, nitro, and chloro; and wherein X— is an anion. The additional cure accelerator can have the structure $[(R^{10})(R^{11})I]^+SbF_6^-$, wherein $R^{10}$ and $R^{11}$ are each independently a $C_{6-14}$ monovalent aromatic hydrocarbon, optionally substituted with from 1 to 4 $C_{1-20}$ alkyl, $C_{1-20}$ alkoxy, nitro, or chloro; for example, 4-octyloxyphenyl phenyl iodonium hexafluoroantimonate.

The curing accelerator can be a metal salt complex, such as a copper (II) aluminum (III), zinc, cobalt, tin salt of an aliphatic or aromatic carboxylic acid selected from copper (II), tin (II), and aluminum (III) salts of acetate, stearate, gluconate, citrate, benzoate, and mixtures thereof. For example, the cure accelerator can be a copper (II) or aluminum (III) salts of β-diketonates; copper (II), iron (II), iron (III), cobalt (II), cobalt (III), or aluminum (III) salts of acetylacetonates; zinc (II), chromium (II), or manganese (II) salts of octoates; or a combination thereof.

When the curable thermosetting composition includes a curing catalyst, the curing catalyst can be included in an amount of 0.01 to 5 wt %, or 0.05 to 5 wt %, or 0.1 to 5 wt %, based on total weight of the curable thermosetting composition.

The curable thermosetting composition can optionally include a curing initiator, such as a peroxide compound. Exemplary peroxide curing initiators can include benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, t-butylperoxybenzoate, t-butylperoxy 2-ethylhexyl carbonate, 2,4-dichlorobenzoyl peroxide, 2,5-dimethylhexane-2,5-dihydroperoxide, butyl-4,4-bis(tert-butyldioxy)valerate, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy) hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, 1,1-di-(tert-butylperoxy)-3,3,5-trimethylcyclohexane, di(trimethylsilyl)peroxide, trimethylsilylphenyltriphenylsilyl peroxide, or the like, or a combination thereof.

When the curable thermosetting composition includes a curing initiator, the curing initiator can be included in an amount of 0.1 to 5 wt %, or 0.5 to 5 wt %, or 1 to 5 wt %, based on total weight of the curable thermosetting composition.

Flame retardants include, for example, organic compounds that comprise phosphorus, bromine, or chlorine. Non-brominated and non-chlorinated phosphorus-containing flame retardants can be preferred in certain applications for regulatory reasons, for example organic phosphates and organic compounds containing phosphorus-nitrogen bonds.

Examples of phosphorous flame retardants include phosphates, phosphazenes, phosphite esters, phosphines, phosphinates, polyphosphates, and phosphonium salts. Phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, xylenyl-diphenyl phosphate; cresyl-diphenyl phosphate; 1,3-phenylenebis(di-2,6-xylenyl phosphate); 9,10-dihydro-9-oxa-10-phosphaphenanthrene-10-oxide (DOPO), tetraphenyl diphosphate (RDP), condensed phosphate compounds such as aromatic condensed phosphate compounds; and cyclic phosphate compounds, bis(diphenyl) phosphate of hydroquinone, bis (diphenyl) phosphate of bisphenol A, or the like, or their oligomeric or polymeric counterparts, or a combination thereof.

Examples of the phosphazene compounds include cyclic and chain phosphazene compounds. The cyclic phosphazene compounds (cyclophosphazenes) have a cyclic structure in which phosphorus-nitrogen double bonds are present in the molecule. Examples of phosphinate compounds include aluminum dialkylphosphinate, aluminum tris-(diethylphosphinate), aluminum tris-(methylethylphosphinate), aluminum tris-(diphenylphosphinate), zinc bis-(diethylphosphinate), zinc bis-(methylphosphinate), zinc bis-(diphenylphosphinate), titanyl his-(diethylphosphinate), titanyl bis-(methylethylphosphinate), and titanyl bis-(diphenylphosphinate). Examples of polyphosphate compounds include melamine polyphosphate, melam polyphosphate, and melem polyphosphate. Examples of phosphonium salt compounds include tetraphenylphosphonium tetraphenylborate. Examples of the phosphite ester compounds include trimethylphosphite and triethylphosphite. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide.

Halogenated materials can also be used as flame retardants, for example bisphenols such as 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromobiphenyl ether, decabromodiphenylethane, as well as oligomeric and polymeric halogenated aromatic compounds, such as brominated styrene, 4,4-dibromobiphenyl, ethylene-bis(tetrabromophthalimide), or a copolycarbonate of bisphenol A and tetrabromobisphenol A and a carbonate precursor, e.g., phosgene. Metal synergists, e.g., antimony oxide, can also be used with the flame retardant.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$. $KAlF_4$, $K_2SiF_6$, or $Na_3AlF_6$.

When the curable thermosetting composition includes a flame retardant, the flame retardant can be included in an amount of greater than 1 wt %, or 1 to 20 wt %, or 5 to 15 wt %, based on total weight of the curable thermosetting composition.

The curable thermosetting composition can further include inorganic or organic fillers, such as a particulate filler, a fibrous filler, or the like, or a combination thereof. Any inorganic and organic fillers, including those known in the art, can be used without limitation.

Exemplary fillers include, for example, clay, talc, kaolin, wollastonite, mica, calcium carbonate, magnesium carbonate; alumina, thiourea, glass powder, B- or Sn-based fillers such as zinc borate, zinc stannate and zinc hydroxystannate; metal oxides such as zinc oxide and tin oxide, alumina, silica (including fused silica, fumed silica, spherical silica, and crystalline silica), boron nitride (including spherical boron nitride), aluminum nitride, silicon nitride, magnesia, magnesium silicate, antimony trioxide, glass fibers (chopped, milled, or cloth), glass mat, glass bubbles, hollow glass microspheres, aramid fibers, quartz, or the like, or a combination thereof. Other exemplary inorganic fillers include powdered titanium ceramics such as any one of the titanates of barium, lead, strontium, calcium, bismuth, magnesium, or the like. Inorganic fillers also include hydrates such as aluminum hydroxide, magnesium hydroxide, zeolite, and hydrotalcite. In some aspects, the filler can be treated with a coupling agent as disclosed herein.

Glass fibers include those based on E, A, C, ECR, R, S, D, and NE glasses, as well as quartz. The glass fiber can have any suitable diameter, such as from 2 to 30 micrometers (μm), or 5 to 25 μm, or 5 to 15 μm. The length of the glass fibers before compounding are not limited and can be 2 to 7 millimeters (mm), or 1.5 to 5 mm. Alternatively, longer glass fibers or continuous glass fibers can be used. Suitable glass fiber is commercially available from suppliers such as Owens Corning, Nippon Electric Glass, PPG, and Johns Manville.

The organic filler can be, for example, polytetrafluoroethylene powder, polyphenylene sulfide powder, and poly (ether sulfones) powder, poly(phenylene ether) powder, polystyrene, divinylbenzene resin, or the like, or a combination thereof.

The filler can be selected based on the thermal expansion coefficient (CTE) and thermal conductivity requirements. For example, $Al_2O_3$, BN, AlN, or a combination thereof, can be used for an electronics module with high thermal conductivity. For example, MgO can be used for increased thermal conductivity and increased CTE. For example, $SiO_2$ (e.g., amorphous $SiO_2$) can be used for a lightweight module having a low CTE and a small dielectric constant.

When the curable thermosetting composition includes a filler, the filler can be included in an amount of greater than 1 wt %, or 1 to 50 wt %, or 1 to 30 wt %, or 10 to 30 wt %, based on total weight of the curable thermosetting composition.

Coupling agents, also referred to as adhesion promoters, include chromium complexes, silanes, titanates, zircon-aluminates, olefin-maleic anhydride copolymers, reactive cellulose esters, and the like. Exemplary olefin-maleic anhydride copolymers can include maleic anhydride grafted polyethylene, maleic anhydride grafted polypropylene, or a combination thereof. Exemplary silanes can include epoxysilane compound, aminosilane compounds methacryloxysilane compounds, vinylsilane compounds, or a combination thereof.

When the curable thermosetting composition includes a coupling agent, the coupling agent can be included in an amount of 0.01 to 5 wt %, or 0.05 to 5 wt %, or 0.1 to 5 wt %, based on total weight of the curable thermosetting composition.

The curable thermosetting composition can optionally include a solvent. The solvent can be, for example, a $C_{3-8}$ ketone, a $C_{3-8}$ N,N-dialkylamide, a $C_{4-16}$ dialkyl ether, a $C_{6-12}$ aromatic hydrocarbon, a $C_{1-3}$ chlorinated hydrocarbon, a $C_{3-6}$ alkyl alkanoate, a $C_{2-6}$ alkyl cyanide, or a combination thereof. Specific ketone solvents include, for example, acetone, methyl ethyl ketone, methyl isobutyl ketone, or a combination thereof. Specific $C_{4-8}$ N, N-dialkylamide solvents include, for example, dimethylformamide, dimethylacetamide, N-methyl-2-pyrrolidone, or a combination thereof. Specific dialkyl ether solvents include, for example, tetrahydrofuran, ethylene glycol monomethylether, dioxane, or a combination thereof. Specific aromatic hydrocarbon solvents include, for example, benzene, toluene, xylenes, styrene, divinylbenzenes, or a combination thereof. The aromatic hydrocarbon solvent can be non-halogenated. Specific $C_{3-6}$ alkyl alkanoates include, for example, methyl acetate, ethyl acetate, methyl propionate, ethyl propionate, or a combination thereof. Specific $C_{2-6}$ alkyl cyanides include, for example, acetonitrile, propionitrile, butyronitrile, or a combination thereof. Specific $C_{2-6}$ alkyl cyanides include, for example, acetonitrile, propionitrile, butyronitrile, or a combination thereof. For example, the solvent can be N,N-dimethylformamide, N,N-dimethylacetamide, N,N-diethylacetamide, N,N-dimethylmethoxyacetamide, N-methyl-2-pyrrolidone, N-cyclohexylpyrrolidinone, N-methylcaprolactam, 1,3-dimethyl-2-imidazolidone, 1,2-dimethoxyethane, 1,3-dioxane, 1,4-dioxane, tetrahydrofuran, 7-butyrolactone, γ-caprolactone, dimethylsulfoxide, benzophenone, methyl ethyl ketone, methyl isobutyl ketone, cyclohexanone, diglyme, triglyme, tetraglyme, N,N-dimethylethyleneurea, N,N-dimethylpropyleneurea, tetramethylurea, propylene glycol phenyl ether, anisole, veratrole, o-dichlorobenzene, chlorobenzene, trichloroethane, methylene chloride, chloroform, pyridine, picoline, ethyl lactate, n-butyl acetate, butyl cellosolve acetate, butyl carbitol acetate, ethyl cellosolve acetate, ethyl carbitol acetate, propylene carbonate, sulfolane, an ionic liquid, or a combination thereof.

When a solvent is utilized, the curable thermosetting composition can include 2 to 99 wt % of the solvent, based on weight total of the curable thermosetting composition. For example, the solvent amount can be 5 to 80 wt %, or 10 to 70 wt %, or 20 to 60 wt %, based on weight total of the curable thermosetting composition. The solvent can be chosen, in part, to adjust the viscosity of the curable thermosetting composition. Thus, the solvent amount can depend on variables including the type and amount of capped poly(arylene ether) copolymer, the type and amount of other components such as curing additive, the type and amount of any auxiliary thermosetting resin(s), and the processing temperature used for any subsequent processing of the curable thermosetting composition, for example, impregnation of a reinforcing structure with the curable thermosetting composition for the preparation of a composite. The solvent can be anhydrous. For example, the solvent can include less than 100 parts per million (ppm), or less than 50 ppm, or less than 10 ppm of water based on total weight of the solvent.

The curable thermosetting composition can further include a curable unsaturated monomer composition, which can include, for example, a monofunctional styrenic compound (e.g., styrene), a monofunctional (meth)acrylic compound, or the like, or a combination thereof. For example, the curable unsaturated monomer composition can be an alkene-containing monomer or an alkyne-containing monomer. Exemplary alkene- and alkyne-containing monomers includes those described in U.S. Pat. No. 6,627,704 to Yeager et al., and include (meth)acrylates, (meth)acrylamides, N-vinylpyrrolidone, and vinvlazalactones as disclosed in U.S. Pat. No. 4,304,705 of Heilman et al. Exemplary monofunctional monomers include mono(meth)acrylates, such as methyl (meth)acrylate, ethyl (meth)acrylate, isopropyl (meth)acrylate, isooctyl (meth)acrylate, isobornyl (meth)acrylate, (meth)acrylic acid, n-hexyl (meth)acrylate, tetrahydrofurfuryl (meth)acrylate, N-vinylcaprolactam, N-vinylpyrrolidone, (meth)acrylonitrile, or the like, or a combination thereof.

The curable thermosetting composition can, optionally, further include one or more additional additives. Additional additives include, for example, dyes, pigments, colorants, antioxidants, heat stabilizers, light stabilizers, plasticizers, defoaming agents, lubricants, dispersants, flow modifiers, drip retardants, antiblocking agents, antistatic agents, flow-promoting agents, processing aids, substrate adhesion agents, mold release agents, toughening agents, low-profile additives, stress-relief additives, or the like, or a combination thereof. When present, the additional additives can be included in any effective amount, for example in an amount of 0.01 to 20 wt %, or 0.01 to 10 wt %, or 0.01 to 5 wt %, or 0.01 to 1 wt %, based on the total weight of the curable thermosetting composition.

The curable thermosetting composition can be prepared by combining the capped polyindane oligomer and the other optional components disclosed herein using any suitable method.

Also provided is a cured thermoset composition comprising a cured product of the curable thermosetting composition. There is no limitation on the method by which the curable thermosetting composition can be cured. The curable composition can, for example, be cured thermally or by using irradiation techniques, including UV irradiation or electron beam irradiation. For example, a cured product can be obtained by heating the curable thermosetting composition defined herein for a time and temperature sufficient to evaporate the solvent and effect curing. When heat curing is used, the temperature can be 30 to 400° C., or 50 to 250° C., or 100 to 250° C. The heating can be for 1 minute to 24 hours, or 1 minute to 6 hours, or 3 hours to 5 hours. The curing can be staged to produce a partially cured and often tack-free resin, which then is fully cured by heating for longer periods or temperatures within the aforementioned ranges. As used herein, the term "cured" encompasses products that are partially cured or fully cured.

The cured thermoset composition can achieve one or more desirable properties such as improved viscosity, gel time, glass transition temperature ($T_g$), coefficient of thermal expansion (CTE), dielectric constant (Dk), dissipation factor (Df), equilibrium water absorption, or the like, or a combination thereof.

The disclosed curable thermosetting compositions and cured compositions can be used in a variety of applications, including any applications where conventional thermosetting compositions are used. For example, useful articles including the curable thermosetting composition or the cured thermoset composition can be in the form of a composite, a foam, a fiber, a layer, a coating, an encapsulant, an adhesive, a sealant, a molded component, a prepreg, a casing, a laminate, a metal clad laminate, an electronic composite, a structural composite, or a combination thereof. Exemplary uses and applications include coatings such as protective coatings, sealants, weather resistant coatings, scratch resistant coatings, and electrical insulative coatings; adhesives; binders; glues; composite materials such as those using carbon fiber and fiberglass reinforcements. When utilized as a coating, the disclosed compounds and compositions can be deposited on a surface of a variety of underlying substrates. For example, the compositions can be deposited on a surface of metals, plastics, glass, fiber sizings, ceramics, stone, wood, or any combination thereof. The disclosed compositions can be used as a coating on a surface of a metal container (e.g., aluminum or steel), such as those commonly used for packaging and containment in the paint and surface covering industries. The curable thermosetting composition and the cured thermoset composition derived therefrom can also be particularly well suited for use in forming electrical components and computer components.

Methods of forming a composite can include impregnating a reinforcing structure with a curable thermosetting composition; partially curing the curable thermosetting composition to form a prepreg; and laminating a plurality of prepregs. The reinforcing structure can be a porous base material such as a fibrous preform or substrate, or other porous material comprising a ceramic, a polymer, a glass, carbon, or a combination thereof. For example, the porous base material can be woven or non-woven glass fabric, a fiberglass fabric, or carbon fiber. When the article includes a fibrous preform, the method of manufacturing the article can include forming the article from the curable thermosetting composition by coating or impregnating the preform with the curable composition. The impregnated fibrous preform can optionally be shaped before or after removing the solvent. In some aspects, the curable thermosetting composition layer can further comprise a woven or nonwoven glass fabric. For example, the curable layer can be prepared by impregnating the glass fabric with a curable composition and removing the solvent from the impregnated glass fabric. Exemplary reinforcing structures are described, for example, in Anonymous (Hexcel Corporation). "Prepreg Technology", March 2005, Publication No. FGU 017b; Anonymous (Hexcel Corporation), "Advanced Fibre Reinforced Matrix Products for Direct Processes", June 2005, Publication No. ITA 272; and Bob Griffiths, "Farnborough Airshow Report 2006", CompositesWorld.com, September 2006. The weight and thickness of the reinforcing structure are chosen according to the intended use of the composite using criteria well known to those skilled in the production of fiber reinforced resin composites. The reinforced structure can contain various finishes suitable for the thermosetting components of the curable thermosetting composition.

The method of manufacturing the articles from the curable thermosetting composition can include partially curing the curable thermosetting composition to form a prepreg, or fully curing the curable thermosetting composition to form a composite article. References herein to properties of the "cured composition" refer to a composition that is substantially fully cured. For example, the resin in a laminate formed from prepregs is typically substantially fully cured. One skilled in the thermoset arts can determine whether a sample is partially cured or substantially fully cured without undue experimentation. The curing can be before or after removing the solvent from the curable composition. In addition, the article can be further shaped before removal of the solvent or after removal of the solvent, before curing, after partial curing, or after full curing, for example by thermoforming. In an aspect, the article is formed, and the solvent is removed; the article is partially cured (B-staged); optionally shaped; and then further cured.

Commercial-scale methods of forming composites are known in the art, and the curable thermosetting compositions described herein are readily adaptable to existing processes and equipment. For example, prepregs are often produced on treaters. The main components of a treater include feeder rollers, a resin impregnation tank, a treater oven, and receiver rollers. The reinforcing structure (E-glass, for example) is usually rolled into a large spool. The spool is then put on the feeder rollers that turn and slowly roll out the reinforcing structure. The reinforcing structure then moves through the resin impregnation tank, which contains the curable thermosetting composition. The curable composition impregnates the reinforcing structure. After emerging from the tank, the coated reinforcing structure moves upward through the vertical treater oven, which is typically at a temperature of 175 to 200° C., and the solvent is evaporated. The resin begins to polymerize at this time. When the composite comes out of the tower it is sufficiently cured so that the web is not wet or tacky. The cure process, however, is stopped short of completion so that additional curing can occur when laminate is made. The web then rolls the prepreg onto a receiver roll.

Electrical and electronic articles including or derived from the curable thermosetting composition are also provided. Articles include those comprising printed circuits as used in medical or aerospace industries. Still other articles include antennae and like articles. Articles such as printed circuit boards are used, for example, in lighting, solar energy, displays, cameras, audio and video equipment, personal computers, mobile telephones, electronic notepads, and similar devices, or office automation equipment. For example, electrical parts can be mounted on printed circuit boards comprising a laminate. Other exemplary articles prepared from the curable composition for various applications can include copper clad laminates (CCL), for example, metal core copper clad laminates (MCCCL), composite articles, and coated articles, for example multilayer articles.

Dielectric layer can be prepared from the curable thermosetting composition can be useful in a circuit assembly, for example, in a metal-clad laminate such as a copper clad laminate. For example, a laminate can comprise a dielectric layer, a conductive metal circuit layer disposed on the dielectric layer, and optionally, a heat dissipating metal matrix layer disposed on the dielectric layer on a side opposite the conductive metal layer. The dielectric layer can optionally include a fibrous preform (e.g., a fabric layer). For example, the dielectric layer can further include a glass fabric layer.

The conductive metal layer can be in the form of a circuit, and can be copper, zinc, tin, brass, chromium, molybdenum, nickel, cobalt, aluminum, stainless steel, iron, gold, silver, platinum, titanium, or the like, or a combination thereof. Other metals include a copper molybdenum alloy, a nickel-cobalt iron alloy such as KOVAR, available from Carpenter Technology Corporation, a nickel-iron alloy such as INVAR, available from National Electronic Alloys, Inc., a bimetal, a trimetal, a trimetal derived from two-layers of copper and one layer of INVAR, and a trimetal derived from two layers of copper and one layer of molybdenum. Exemplary metal layers comprise copper or a copper alloy. Alternatively, wrought copper foils can be used. Conductive metal layers can have a thickness of 2 to 200 μm, or 5 to 50 μm, or 5 to 40 μm.

A heat dissipating metal matrix layer can be a thermally conductive metal such as aluminum, boron nitride, aluminum nitride, copper, iron, steel, or the like, or a combination thereof. A thermally conductive, electrically conductive metal can be used provided that the metal is electrically isolated from the metal circuit layer. Preferred supporting metal matrix layers can have a thickness of 0.1 to 20 mm, or 0.5 to 10 mm, or 0.8 to 2 mm.

The conductive metal layer and the supporting metal matrix layers can be pretreated to have high surface roughness for enhanced adhesion to the dielectric layer. Treatment methods include washing, flame treatment, plasma discharge, corona discharge, or the like, for example to enhance adhesion of the metal layer. The dielectric layer can adhere firmly to the conductive metal layer or the heat dissipation layer without using an adhesive, or an adhesive can be used to improve adhesion of the dielectric layer to the conductive metal layer or the heat dissipation layer. Exemplary adhesives used to bond the composite sheet to a metal include polyimide adhesives, acrylic adhesives, epoxies, or the like, or a combination thereof.

The copper clad laminates can be made by thermal lamination of one or more dielectric layers, one or more conductive metal layers, and a supporting metal matrix layer, under pressure without using thermosetting adhesives. The dielectric layer can be prepared from the curable thermosetting composition and can be prepared prior to the thermal lamination step by a solvent casting process to form a layer. For example, the dielectric layer, the conductive metal layer, and the thermal dissipation layer can be thermally laminated together by an adhesive-free process under pressure to form a laminate. The electrically conductive metal layer can optionally be in the form of a circuit before laminating, or the conductive metal layer can optionally be etched to form the electrical circuit following lamination. The laminating can be by hot press or roll calendaring methods, for example, a roll-to-roll method. The conductive metal layer in a copper clad laminate can further be patterned to provide a printed circuit board. Furthermore, the copper clad laminates can be shaped to provide a circuit board having the shape of a sheet, a tube, or a rod.

Alternatively, laminates for a circuit assembly can be made by a solution casting method in which the curable thermosetting composition is cast directly onto the electrically conductive metal layer, followed by lamination to the heat dissipating metal matrix layer. For example, the curable thermosetting composition can be cast directly onto the heat dissipating metal matrix layer, followed by lamination to the electrically conductive metal layer.

Multilayer laminates including additional layers can also be made by thermal lamination in one step or in two or more consecutive steps by such processes as hot press or roll calendaring methods. For example, seven layers or fewer can be present in the laminate, or sixteen layers or fewer. In an aspect, a laminate can be formed in one step or in two or more consecutive steps with sequential layers of fabric-thermoset-metal-thermoset-fabric-thermoset-metal foil or a sub-combination thereof with fewer layers, such that the laminate comprises a layer of thermoset film between any layer of metal foil and any layer of fabric. In another aspect, a first laminate can be formed in one step or in two or more consecutive steps with a layer of fabric between two layers of the thermoset, such as a layer of woven glass fabric between two layers of the thermoset. A second laminate can then be prepared by laminating a metal foil to a thermoset side of the first laminate.

Printed circuit boards prepared from the curable thermosetting composition can have an overall thickness of 0.1 to 20 mm, and specifically 0.5 to 10 mm, wherein overall thickness refers to an assembly comprising a layer each of the dielectric layer, the electrically conductive metal layer, and the supporting metal matrix layer. Circuit assemblies can have an overall thickness of 0.5 to 2 mm, and specifically 0.5 to 1.5 mm. There is no limitation on the thickness of the dielectric layer and can be 5 to 1500 μm, or 5 to 750 μm, or 10 to 150 μm, or 10 to 100 μm. For example, the printed circuit board can be a metal core printed circuit board (MCPCB) for use in a light emitting diode (LED) application.

The curable thermosetting composition can be used as a coating, for example in the preparation of a multilayer article. A method of manufacturing the coating can include combining the curable thermosetting composition and optionally a fluoropolymer and forming a coating on a substrate. For example, a multilayer article can be manufactured by forming a layer including the curable thermosetting composition, removing the solvent from the layer and optionally curing to provide a primer layer, forming a second layer comprising a ceramic (e.g., $Al_2O_3$, $TiO_2$, $ZrO_2$, $Cr_2O_3$, $SiO_2$, MgO, BeO, $Y_2O_3$, $Al_2O_3$—$SiO_2$, MgO—$ZrO_2$, SiC, WC, BaC, TiC, $Si_3N_4$, TiN, BN, AlN, TiB, $ZrB_2$, or the like), a thermoplastic polymer, a fluoropolymer (e.g., polytetrafluoroethylene, tetrafluoroethylene-perfluoroalkylvinylether copolymers, tetrafluoroethylene-hexafluoropropylene copolymers, polychlorotrifluoroethylene, tetrafluoroethylene-ethylene copolymers, polyvinylidene fluoride, or the like), or a combination thereof on the primer layer to provide the multilayer article, and optionally thermally treating the multilayer article to cure the curable thermosetting composition. In some aspects, the second layer can further include the curable thermosetting composition.

Additional applications for the curable thermosetting compositions include, for example, acid bath containers; neutralization tanks; aircraft components; bridge beams; bridge deckings; electrolytic cells; exhaust stacks; scrubbers; sporting equipment; stair cases; walkways; automobile exterior panels such as hoods and trunk lids; floor pans; air scoops; pipes and ducts, including heater ducts; industrial fans, fan housings, and blowers; industrial mixers; boat hulls and decks; marine terminal fenders; tiles and coatings; building panels; business machine housings; trays, including cable trays; concrete modifiers; dishwasher and refrigerator parts; electrical encapsulants; electrical panels; tanks, including electrorefining tanks, water softener tanks, fuel tanks, and various filament-wound tanks and tank linings; furniture; garage doors; gratings; protective body gear; luggage; outdoor motor vehicles; pressure tanks; optical waveguides; radomes; railings; railroad parts such as tank cars; hopper car covers; car doors; truck bed liners; satellite dishes; signs; solar energy panels; telephone switchgear housings; tractor parts; transformer covers; truck parts such as fenders, hoods, bodies, cabs, and beds; insulation for rotating machines including ground insulation, turn insulation, and phase separation insulation; commutators; core insulation and cords and lacing tape; drive shaft couplings; propeller blades; missile components; rocket motor cases; wing sections; sucker rods; fuselage sections; wing skins and flarings; engine narcelles; cargo doors; tennis racquets; golf club shafts; fishing rods; skis and ski poles; bicycle parts; transverse leaf springs; pumps, such as automotive smog pumps; electrical components, embedding, and tooling, such as electrical cable joints; wire windings and densely packed multi-element assemblies; sealing of electromechanical devices; battery cases; resistors; fuses and thermal cut-off devices; coatings for printed wiring boards; casting items such as capacitors, transformers, crankcase heaters; small molded electronic parts including coils, capacitors, resistors, and semiconductors; as a replacement for steel in chemical processing, pulp and paper, power generation, and wastewater treatment; scrubbing towers; pultruded parts for structural applications, including structural members, gratings, and safety rails; swimming pools, swimming pool slides, hot-tubs, and saunas; drive shafts for under the hood applications; dry toner resins for copying machines; marine tooling and composites; heat shields; submarine hulls; prototype generation; development of experimental models; laminated trim; drilling fixtures; bonding jigs; inspection fixtures; industrial metal forming dies; aircraft stretch block and hammer forms; vacuum molding tools; flooring, including flooring for production and assembly areas, clean rooms, machine shops, control rooms, laboratories, parking garages, freezers, coolers, and outdoor loading docks; electrically conductive compositions for antistatic applications; for decorative flooring; expansion joints for bridges; injectable mortars for patch and repair of cracks in structural concrete; grouting for tile; machinery rails; metal dowels; bolts and posts; repair of oil and fuel storage tanks, and numerous other applications.

Processes useful for preparing the articles and materials include those generally known to the art for the processing of thermosetting resins. Such processes have been described in the literature as in, for example, Engineered Materials Handbook, Volume 1. Composites. ASM International Metals Park. Ohio, copyright 1987 Cyril A. Dostal Senior Ed, pp. 105-168 and 497-533, and “Polyesters and Their Applications” by Bjorksten Research Laboratories, Johan Bjorksten (pres.) Henry Tovey (Ch. Lit. Ass.). Betty Harker (Ad. Ass.), James Henning (Ad. Ass.). Reinhold Publishing Corporation, New York, 1956. Processing techniques include resin transfer molding; sheet molding; bulk molding; pultrusion; injection molding, including reaction injection molding (RIM); atmospheric pressure molding (APM); casting, including centrifugal and static casting open mold casting; lamination including wet or dry lay-up and spray lay up; also included are contact molding, including cylindrical contact molding; compression molding; including vacuum assisted resin transfer molding and chemically assisted resin transfer molding; matched tool molding; autoclave curing; thermal curing in air; vacuum bagging; pultrusion; Seeman’s Composite Resin Infusion Manufacturing Processing (SCRIMP); open molding, continuous combination of resin and glass; and filament winding, including cylindrical filament winding. For example, an article can be prepared by a resin transfer molding process.

In an aspect, also provided is an article derived from the curable thermosetting composition, wherein the article is a composite, a foam, a fiber, a layer, a coating, an encapsulant, an adhesive, a sealant, a molded component, a prepreg, a casing, a cast article, a laminate, or a combination thereof; or, wherein the article is a metal clad laminate, an electronic composite, a structural composite, or a combination thereof. Articles can be manufactured as disclosed herein, for example by casting, molding, extruding, or the like, and removing the solvent from the formed article. In some aspects, the article can be a layer, and can be formed by casting the curable composition onto a substrate to form a cast layer. The solvent can be removed by any number of means, including by heating the cast layer, heating the cast layer under heat and pressure, for example by laminating the cast layer to another substrate. In some aspects, articles prepared by the above-described methods can include adhesives, packaging material, capacitor films, or circuit board layers. In some aspects, articles prepared from the curable composition can be a dielectric layer, or a coating disposed on a substrate, for example a wire or cable coating. For example, the article can be a dielectric layer in a circuit material, for example in a printed circuit board, used, for example, in lighting or communications applications. Other exemplary articles prepared from the curable composition can be one or more painted layers. The curable compositions can be used to prepare articles as disclosed herein for other curable thermosetting compositions.

This disclosure is further illustrated by the following examples, which are non-limiting.

EXAMPLES

Components used in the examples are summarized in Table 1.

TABLE 1

| Abbreviation | Description | CAS Reg. No. | Supplier |
|---|---|---|---|
| TMBPA | 2,2-Bis(3,5-dimethyl-4-hydroxyphenyl)propane | 5613-46-7 | Deepak |
| BPA | Bisphenol A | 80-05-7 | SABIC |
| Diallyl BPA | 2,2'-Diallylbisphenol A | 1745-89-7 | Evonik |
| TBBPA | Tetrabromo BPA | 79-94-7 | Albemarle |
| DIPB | 1,3-diisopropenylbenzene | 3748-13-8 | TCI |
| pDIPB | 1,4-diisopropenylbenzene | 1605-18-1 | TCI |
| Triflic Acid | Trifluoromethanesulfonic Acid | 1493-13-6 | Sigma Aldrich |
| TFA | Trifluoroacetic Acid | 76-05-1 | Sigma Aldrich |
| Toluene | Toluene | 108-88-3 | Fisher Scientific |
| DCE | Dichloroethane | 107-06-2 | Fisher Scientific |
| DCM | Dichloromethane | 75-09-2 | Fisher Scientific |
| NaHCO3 | Sodium Bicarbonate | 144-55-8 | Fisher Scientific |
| TBHQ | t-butylhydroquinone | 1948-33-0 | Sigma Aldrich |
| NaOH | Sodium Hydroxide pellets | 1310-73-2 | Fisher Scientific |
| NaOH (aq.) | Sodium Hydroxide (40% w/w aqueous solution) | 1310-73-2 | Fisher Scientific |
| MAA | Methacrylic anhydride | 760-93-0 | Alfa Aeser |
| DMAP | N,N-dimethyl amino pyridine | 1122-58-3 | Sigma Aldrich |
| MeOH | Methanol | 67-56-1 | Fisher Scientific |
| $CH_3Cl$ | Chloroform | 67-66-3 | Fisher Scientific |
| TAIC | Triallyl isocyanurate | 1025-15-6 | Acros Organics |
| Peroxide | Di(tert-butylperoxyisoproyl)benzene | 25155-25-3 | Akzo Nobel |

Weight average molecular weight ($M_w$) was measured by gel permeation chromatography (GPC). Number average molecular weight ($M_n$) was measured by proton nuclear magnetic resonance ($^1$H-NMR) spectroscopy at a frequency of 600 megahertz (MHz) and by GPC using polystyrene standards. Average degree of functionality was determined by $^1$H-NMR spectroscopy at a frequency of 600 MHz. Glass transition temperature ($T_g$) was measured by differential scanning calorimetry (DSC) from 25 to 300° C. at a heating rate of 20° C./min. Solution viscosity was measured at 25° C. (Brookfield Viscometer; spindle 00) using a 50 wt % solution of the oligomer in either MEK or toluene. Viscosity measurements were done under nitrogen using 25 mm parallel plates with a target gap of 1 mm. Oscillation temperature ramping was used with a starting temperature of 80° C., and heating ramp rate of 3° C./min with constant strain of 1%, and angular frequency of 10 Rad/s. Gel time was measured under nitrogen using 25 mm parallel plates with a target gap of 1 mm. Oscillation temperature ramping was used with a starting temperature of 80° C., and heating ramp rate of 5° C./min with constant strain of 30%, and angular frequency of 10 Rad/s. Dielectric measurements were performed using an Agilent Technologies E5071C network analyzer equipped with split post resonator. SPDR, and fixture at 10 GHz. A Keysight E4991B impedance analyzer equipped with a Hewlett Packard 16453A parallel plate fixture is used for Dk and Df measurements at 100 MHz to 10 GHz.

Example 1. Synthesis of Uncapped Polyindane Oligomer (BPA-DIPB)

74.5 grams (g) of BPA and 1.3 g of NaOH pellets were charged to a 3-neck round bottom flask. The flask was placed into a heating mantle with temperature control via an $I^2R$ THERMO-O-WATCH controller and a thermocouple equipped directly into the contents of the flask. A vacuum distillation attachment was connected to the remaining neck of the flask and was equipped with a single neck round-bottom collection flask charged with 0.1 g of sodium bicarbonate. The collection flask was placed into an ice water bath (0° C.). The contents of both flasks were evacuated under reduced pressure. The BPA and sodium hydroxide mixture was then heated slowly until melting (~130-145° C.) and stirred with a magnetic stir bar. A yellow distillate was retrieved that formed a solid upon cooling by the ice bath. After completion of the distillation, minor amounts of residue were left behind in the original 3-neck flask. The distillate was taken and dissolved in 100 milliliters (mL) of methylene chloride and added to a first addition funnel. In a separate, second addition funnel 100 g of DIPB was charged along with 100 mL of methylene chloride. In a 3-neck round bottom flask 10 mL of TFA was added to 100 mL of methylene chloride and equipped with a magnetic stir bar. The two addition funnels were attached to the remaining necks of the flask. The TFA-methylene chloride solution was stirred vigorously while the distillate solution and DIPB solution were added to the flask at a rate of 4 drops per minute. Upon completion of the addition the monomers and endcaps to the flask, 3 drops of triflic acid were added and the solution was to stirred overnight. A white powder was precipitated from the solution using a mixture of methanol (600 mL) and distilled water (200 mL). The powder was collected via vacuum filtration and subsequently washed in water (100° C.) for 4 hours to remove excess catalyst. The resulting product was obtained as a powder and was dried in a vacuum oven under reduced pressure.

Example 2. Synthesis of Uncapped Polyindane Oligomer (BPA-pDIPB)

This example was prepared following a similar procedure to Example 1, with the same amount and type of reagents, except using 100 g of pDIPB instead of 100 g of DIPB.

Example 3. Synthesis of Uncapped Polyindane Oligomer (BPA-DIPB)

301.01 g of BPA and 1.22 g of NaOH pellets were charged to a 3-neck round bottom flask. The flask was placed into a heating mantle with temperature control via an $I^2R$ THERMO-O-WATCH controller and a thermocouple equipped directly into the contents of the flask. A vacuum distillation attachment was connected to the remaining neck of the flask and equipped with a collection flask. The distillation column was equipped with another 3-neck round-bottom flask that was charged with dichloroethane (300 mL) and 5 mL of TFA. This flask was also equipped with a magnetic stir bar and an addition funnel charged with 246.8 g of DIPB and 300 mL of dichloroethane. Both flasks were under reduced pressure when the BPA and sodium hydroxide mixture was heated slowly until melting (about 140-145° C.) and stirred with the magnetic stir bar. As distillate began to come over the addition funnel containing the DIPB was opened to match the addition rate of the distillate. The reaction flask containing the dichloroethane and TFA was stirred vigorously while the monomer and endcap were being added. Once the distillation was finished and all DIPB was added, the flask was returned to atmospheric pressure and allowed to stir for 16 hours. A white powder was precipitated by adding a mixture of 600 mL of methanol and 200 mL of distilled water to the product. The resulting powder was subsequently pulverized using a blender and washed in methanol and water (three times each). The product was then washed in water (100° C.) until a neutral pH was obtained. The powder was dried under reduced pressure. GPC: Mw=1339 g/mol, Mn=836 g/mol (polycarbonate standards).

Example 4. Synthesis of Uncapped Polyindane Oligomer (TMBPA-DIPB)

81.3 g of TMBPA and 0.8 g of NaOH pellets were charged to a 3-neck round bottom flask. The flask was placed into a heating mantle with temperature control via an $I^2R$ THERMO-O-WATCH controller and a thermocouple equipped directly into the contents of the flask. A vacuum distillation attachment was connected to the remaining neck of the flask and was equipped with a single neck round-bottom collection flask charged with 0.1 g of sodium bicarbonate. The collection flask was placed into an ice water bath. Both flasks were under reduced pressure when the BPA and sodium hydroxide mixture was heated slowly until melting (~200° C.) and stirred with the magnetic stir bar. A yellow distillate was retrieved that formed a solid when cooled by the ice bath. Upon completion of the distillation, minor amounts of residue were left behind in the original 3-neck flask. The distillate was taken and dissolved in 75 mL of methylene chloride and added to an addition funnel. In a separate addition funnel 58.87 g of DIPB was charged along with 75 mL of methylene chloride. In a 3-neck round bottom 3 mL of TFA acid was added to 150 mL of methylene chloride and equipped with a magnetic stir bar. The two addition funnels were attached to the remaining necks of the funnel. The TFA-methylene chloride solution was stirred vigorously while the distillate solution and DIPB solution were added to the flask at a rate of 4 drops per minute. The reaction was monitored with GPC and was found to be complete in 4 hours. A white powder was precipitated from the solution using a mixture of methanol (600 mL) and distilled water (200 mL). The powder was isolated via vacuum filtration and subsequently washed in boiling water for 4 hours to remove excess catalyst. The resulting product was obtained as a powder and was dried in a vacuum oven under reduced pressure. GPC: Mw=1956 g/mol, Mn=1003 g/mol (polycarbonate standards).

Example 5: Synthesis of Methacrylate Capped Polyindane Oligomer (BPA-DIPB-2MA)

BPA-DIPB oligomer (50 g) of Example 3 was dissolved in 89 g toluene in a 250 mL 3-neck round bottom flask equipped with a heating mantle, dean-stark condenser, agitator, and thermocouple. Azeotropic distillation was performed to ensure the removal of water at 120° C. After the removal of water, the reaction mixture was cooled to 85° C., and DMAP (0.5 g) was added thereto. After complete dissolution of DMAP, MAA (13.31 grams) was added slowly to the mixture over 15 minutes using an addition funnel. The reaction temperature was raised to 110° C. for gentle reflux. The reaction was maintained at reflux under stirring for 4 hours and subsequently allowed to cool. The BPA-DIPB-2MA product was isolated as a powder by precipitation into methanol. The product was further dried under vacuum and nitrogen at 110° C. for 16 hours. Tg=184° C. (DSC).

Example 6. Synthesis of Methacrylate Capped Polyindane Oligomer (TMBPA-DIPB-2MA)

TMBPA-DIPB oligomer (50 g) of Example 4 was dissolved in 89 g of toluene in a 250 mL 3-neck round bottom flask equipped with a heating mantle, dean-stark condenser, agitator, and thermocouple. Azeotropic distillation was performed to ensure the removal of water at 120° C. After the removal of water, the reaction mixture was cooled to 85° C., and DMAP (0.5 g) was added thereto. After complete dissolution of DMAP, MAA (12.15 g) was added to the mixture slowly over 15 minutes using an addition funnel. The reaction temperature was raised to 110° C. for gentle reflux. The reaction was maintained at reflux under stirring for 4 hours and then allowed to cool. The toluene solution was washed twice with 30 g of deionized water. The toluene phase was separated and the TMBPA-DIPB-2MA was isolated by precipitation into methanol. The powder was further dried under vacuum and nitrogen at 110° C. for 16 hours.

Curable compositions were prepared by dissolving and dispersing the components shown in Table 2 in chloroform. Chloroform was removed under reduced pressure and nitrogen until a dried powder was obtained. The obtained dried powder was used for chemorheology and further cured into castings for performance evaluation. The preparation of the castings is as follows: The compositions were partially cured to the gel time. The partially cured compositions were transferred into a 40 mm dimeter die and the die was placed under a hot die press. The samples were cured by ramping the temperature to 150° C. under pressure (1 ton). Once the temperature was attained, the sample was cooled to 70° C., and the die was transferred into a vacuum oven, where the sample was cured at 200° C. for 120 minutes under vacuum.

Table 2 shows the formulation and properties of thermosetting Formulations A and B. The properties are gel time (seconds, s), viscosity (Pascal seconds, Pa s), dielectric constant (Dk), and dissipation factor (Df).

TABLE 2

| | Formulation A (wt %) | Formulation B (wt %) |
|---|---|---|
| Component | | |
| TMBPA-DIPB-2MA | 68 | |
| BPA-DIPB-2MA | | 68 |
| Crosslinking Agent | 29 | 29 |
| Peroxide | 3 | 3 |
| Properties | | |
| Gel time (s) | 690 | 460 |
| Viscosity (Pa s) | 15 | 145 |
| Dielectric Constant, Dk | 2.52 (at 1 GHz) | 2.56 ± 0.01 (at 10 GHz) |
| Dissipation Factor, Df (×$10^3$) | 3.50 (at 1 GHz) | 5.78 ± 0.02 (at 10 GHz) |

The results demonstrate that the Examples can concurrently achieve a beneficial combination of properties, including dissipation factor, dielectric constant, viscosity, and gel time. The curable thermosetting compositions therefore can provide performance attributes desirable for resins used in electronic materials.

Aspect 1. A capped polyindane oligomer of formula (1):

(1)

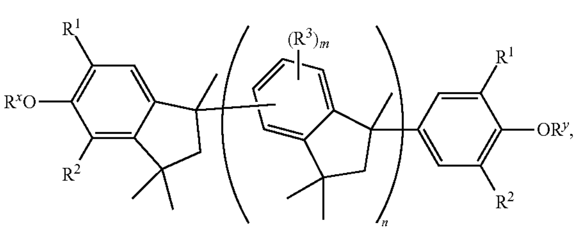

wherein $R^1$, $R^2$, and $R^3$ are each independently hydrogen, halogen. $C_{1-12}$ hydrocarbyl provided that the hydrocarbyl group is not tertiary hydrocarbyl. $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; $R^x$ and $R^y$ are each independently a hydrogen atom or a group represented by:

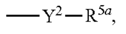,

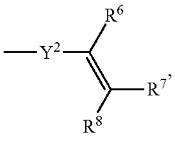,

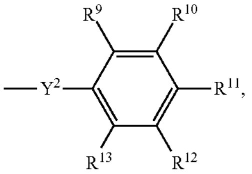, or

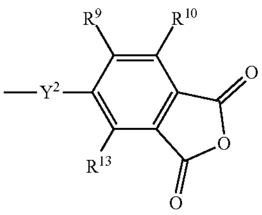

wherein $Y^2$ is a divalent linking group having one of formulas

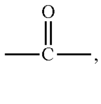, 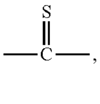, 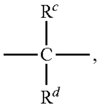, 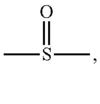, or 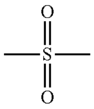

wherein each occurrence of $R^c$ and $R^d$ independently is hydrogen or $C_{1-12}$ alkyl, $R^{5a}$ is an epoxide-containing group, a cyanate-containing group, or a $C_{1-12}$ hydrocarbyl optionally substituted with one or two carboxylic acid groups, each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid, and each occurrence of $R^9$, $R^{10}$, $R^{11}$, $R^{12}$, and $R^{13}$ independently is hydrogen, halogen, $C_{1-12}$ alkyl, $C_{2-12}$ alkenyl, hydroxy, amino, maleimide, carboxylic acid, or a $C_{2-20}$ alkyl ester; provided that at least one of $R^x$ and $R^y$ is not a hydrogen atom; m is an integer of 0 to 3, preferably 0 to 2, more preferably 0 to 1; and n is an integer of 2 to 20, preferably 3 to 16.

Aspect 2. The capped polyindane oligomer of aspect 1, wherein the capped polyindane oligomer is of formula (2):

(2)

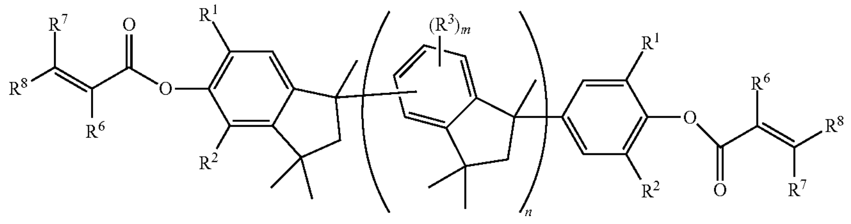

wherein, $R^1$, $R^2$, and $R^3$ are each independently hydrogen, halogen, $C_{1-12}$ hydrocarbyl provided that the hydrocarbyl group is not tertiary hydrocarbyl, $C_{1-12}$ hydrocarbylthio. $C_{1-12}$ hydrocarbyloxy, or $C_{2-12}$ halohydrocarbyloxy wherein at least two carbon atoms separate the halogen and oxygen atoms; each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid; m is an integer of 0 to 3, preferably 0 to 2, more preferably 0 to 1; and n is an integer of 2 to 20, preferably 3 to 16.

Aspect 3. The capped polyindane oligomer of aspect 1 or 2, wherein the capped polyindane oligomer has an average of 1.1 to 2 reactive end groups per molecule; or 1.4 to 2 reactive end groups per molecule; or 1.8 to 2 reactive end groups per molecule.

Aspect 4. The capped polyindane oligomer of any one of the preceding aspects, wherein the capped polyindane oligomer is prepared by reacting a capping agent and an uncapped polyindane oligomer of formula (3):

(3)

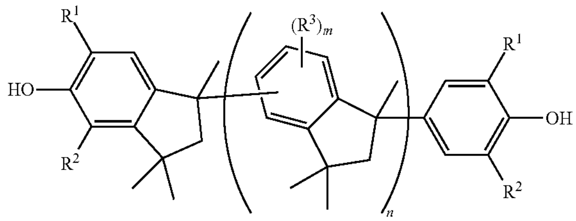

wherein $R^1$, $R^2$, and $R^3$ are each independently hydrogen, halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; m is an integer of 0 to 3, preferably 0 to 2, more preferably 0 to 1; and n is an integer of 2 to 20, preferably 3 to 16.

Aspect 5. The capped polyindane oligomer of any one of the preceding aspects, wherein $R^1$ and $R^2$ are each independently hydrogen or $C_{1-12}$ primary alkyl; or hydrogen or $C_{1-6}$ primary alkyl; preferably, wherein $R^1$ and $R^2$ are hydrogen.

Aspect 6. The capped polyindane oligomer of any one of the preceding aspects, wherein m is 0.

Aspect 7. The capped polyindane oligomer of any one of the preceding aspects, wherein the capped polyindane oligomer is derived from polycondensation of a di(isopropenyl)benzene in the presence of an acid catalyst and a cracking product of a dihydric phenol.

Aspect 8. The capped polyindane oligomer of aspect 7, wherein the dihydric phenol comprises a compound of formula (4):

(4)

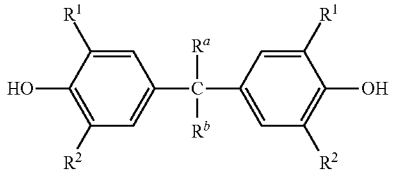

wherein $R^1$ and $R^2$ are each independently hydrogen, halogen, $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and $R^a$ and $R^b$ are each independently hydrogen, $C_{1-12}$ hydrocarbyl, or $C_{1-6}$ hydrocarbylene, provided that at least one of $R^a$ and $R^b$ is $C_{1-12}$ alkyl.

Aspect 9. The capped polyindane oligomer of aspect 7 or 8, wherein the di(isopropenyl)benzene is 1,2-diisopropenylbenzene, 1,3-diisopropenylbenzene, 1,4-diisopropenylbenzene, or a combination thereof; preferably, 1,3-diisopropenylbenzene, 1,4-diisopropenylbenzene, or a combination thereof; more preferably, 1,3-diisopropenylbenzene.

Aspect 10. A method of manufacturing the capped polyindane oligomer of any one of aspects 1 to 9, the method comprising reacting a di(isopropenyl)benzene in the presence of an acid catalyst and a cracking product of a dihydric phenol.

Aspect 11. The method of aspect 10, wherein the acid catalyst is a Lewis acid or a Bronsted acid; preferably, wherein the acid catalyst is trifluoroacetic acid, $SnCl_4$, $BF_3$, $H_2SO_4$, or a combination thereof.

Aspect 12. The method of aspect 10 or 11, further comprising reacting a capping agent with an uncapped polyindane oligomer comprising a phenolic end group under conditions effective to provide a reaction mixture comprising the capped polyindane oligomer.

Aspect 13. A curable thermosetting composition comprising the capped polyindane oligomer of any one of aspects 1 to 9.

Aspect 14. An article derived from the curable thermosetting composition of aspect 13.

Aspect 15. The article of aspect 14, wherein the article is a composite, a foam, a fiber, a layer, a coating, an encapsulant, an adhesive, a sealant, a molded component, a prepreg, a casing, a cast article, a laminate, or a combination thereof; preferably, wherein the article is a metal clad laminate, an electronic composite, a structural composite, or a combination thereof.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). Disclosure of a narrower range or more specific group in addition to a broader range is not a disclaimer of the broader range or larger group.

The singular forms "a" "an," and "the" include plural referents unless the context clearly dictates otherwise. "Combination" is inclusive of blends, mixtures, alloys, reaction products, and the like. The terms "first," "second," and the like, do not denote any order, quantity, or importance, but rather are used to distinguish one element from another. "Or" means "and/or" unless clearly stated otherwise. Reference throughout the specification to "an aspect" means that a particular element described in connection with the aspect is included in at least one aspect described herein and may or may not be present in other aspects. In addition, it is to be understood that the described elements may be combined in any suitable manner in the various aspects. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "hydrocarbyl" refers to a monovalent group containing carbon and hydrogen. Hydrocarbyl can be alkyl, cycloalkyl, alkenyl, cycloalkenyl, aryl, alkylaryl, or arylalkyl as defined below. The term "hydrocarbylene" refers to a divalent group containing carbon and hydrogen. Hydrocarbylene can be alkylene, cycloalkylene, arylene, alkylarylene, or arylalkylene as defined below. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC{=}CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylaryl" means an aryl group substituted with an alkyl group. "Arylalkyl" means an alkyl group substituted with an aryl group (e.g., benzyl). "Aryloxy" means an aryl group with the indicated number of carbon atoms attached through an oxygen bridge (—O—). "Alkyl ester" means a group of the formula —C(O)OR, wherein R is an alkyl group. "Amino" means a monovalent radical of the formula —NRR' wherein R and R' are independently hydrogen or a $C_{1-30}$ hydrocarbyl, for example a $C_{1-20}$ alkyl group or a $C_{6-30}$ aryl group. "Halogen" or "halogen atom" means a fluorine, chlorine, bromine, or iodine atom. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P.

Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro ($—NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkyl (e.g., benzyl), $C_{7-12}$ alkylaryl (e.g., toluyl), $C_{4-12}$ heterocycloalkyl. $C_{3-12}$ heteroaryl, $C_{1-6}$ alkyl sulfonyl ($—S({=}O)_2$-alkyl), $C_{6-12}$ arylsulfonyl ($—S({=}O)_2$-aryl), or tosyl ($CH_3C_6H_4SO_2—$), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the compound or group, including those of any substituents.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A capped polyindane oligomer of formula (1):

(1)

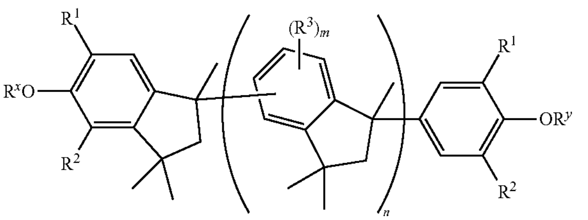

wherein, $R^1$ and $R^2$ are each $C_{1-12}$ hydrocarbyl groups; and $R^3$ is independently hydrogen, halogen, or $C_{1-12}$ hydrocarbyl, provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;

$R^X$ and $R^y$ are each independently a hydrogen atom or a group represented by:

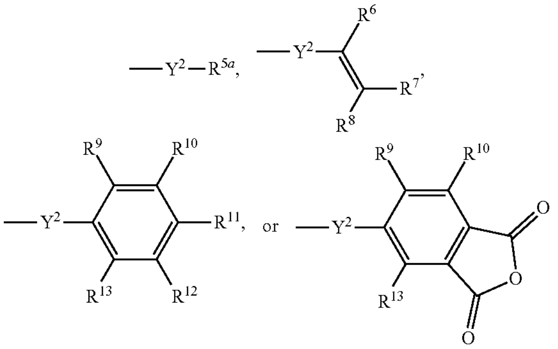

wherein, $Y^2$ is a divalent linking group having one of formulas

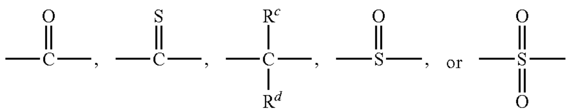

wherein, each occurrence of $R^c$ and $R^d$ independently is hydrogen or $C_{1-12}$ alkyl, $R^a$ is an epoxide-containing group, a cyanate-containing group, or a $C_{1-12}$ hydrocarbyl optionally substituted with one or two carboxylic acid groups, each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid, and each occurrence of $R^9$, $R^{10}$, $R^{11}$, $R^{12}$, and $R^{13}$ independently is hydrogen, halogen, $C_{1-12}$ alkyl, $C_{2-12}$ alkenyl, hydroxy, amino, maleimide, carboxylic acid, or a $C_{2-20}$ alkyl ester; provided that at least one of $R^x$ and $R^y$ is not a hydrogen atom;

m is an integer of 0 to 3; and n is an integer of 2 to 20.

2. The capped polyindane oligomer of claim 1, wherein the capped polyindane oligomer is of formula (2):

(2)

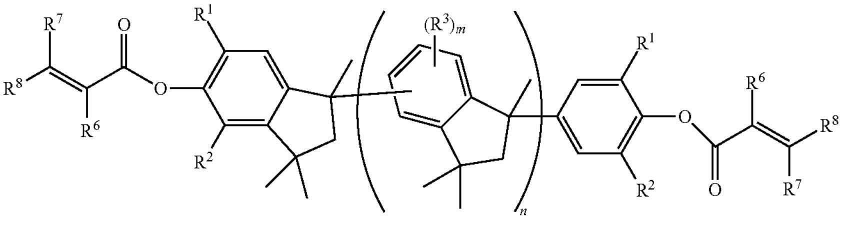

wherein, $R^1$ and $R^2$ are each $C_{1-12}$ hydrocarbyl groups; and $R^3$ is independently hydrogen, halogen, or $C_{1-12}$ hydrocarbyl, provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;

each occurrence of $R^6$, $R^7$, and $R^8$ independently is hydrogen, $C_{1-18}$ hydrocarbyl, $C_{2-18}$ hydrocarbyloxycarbonyl, nitrile, formyl, carboxylic acid, imidate, or thiocarboxylic acid;

m is an integer of 0 to 3; and n is an integer of 2 to 20.

3. The capped polyindane oligomer of claim 1, wherein the capped polyindane oligomer has an average of 1.1 to 2 reactive end groups per molecule; or 1.4 to 2 reactive end groups per molecule; or 1.8 to 2 reactive end groups per molecule.

4. The capped polyindane oligomer of claim 1, wherein the capped polyindane oligomer is prepared by reacting a capping agent and an uncapped polyindane oligomer of formula (3):

(3)

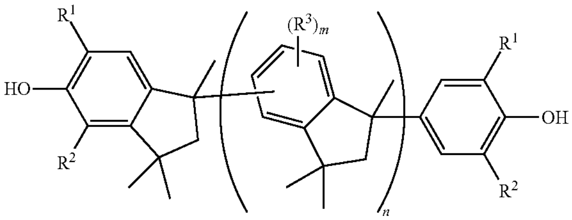

wherein, $R^1$ and $R^2$ are each $C_{1-12}$ hydrocarbyl groups; and $R^3$ is independently hydrogen, halogen, or $C_{1-12}$ hydrocarbyl, provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;

m is an integer of 0 to 3; and n is an integer of 2 to 20.

5. The capped polyindane oligomer of claim 1, wherein m is 0.

6. The capped polyindane oligomer of claim 1, wherein the capped polyindane oligomer is derived from polycondensation of a di (isopropenyl) benzene in the presence of an acid catalyst and a cracking product of a dihydric phenol.

7. The capped polyindane oligomer of claim 6, wherein the dihydric phenol comprises a compound of formula (4):

(4)

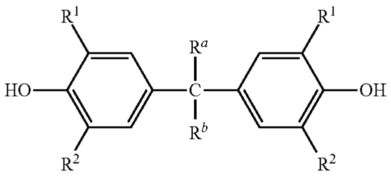

wherein, $R^1$ and $R^2$ are each $C_{1-12}$ hydrocarbyl groups provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and $R^a$ and $R^b$ are each independently hydrogen, $C_{1-12}$ hydrocarbyl, or $C_{1-6}$ hydrocarbylene, provided that at least one of $R^a$ and $R^b$ is $C_{1-12}$-alkyl.

8. The capped polyindane oligomer of claim 6, wherein the di (isopropenyl) benzene is 1,2-diisopropenylbenzene, 1,3-diisopropenylbenzene, 1,4-diisopropenylbenzene, or a combination thereof.

9. A method of manufacturing the capped polyindane oligomer of claim 1, the method comprising reacting a di (isopropenyl) benzene in the presence of an acid catalyst and a cracking product of a dihydric phenol.

10. The method of claim 9, wherein the acid catalyst is a Lewis acid or a Bronsted acid.

11. The method of claim 9, further comprising reacting a capping agent with an uncapped polyindane oligomer comprising a phenolic end group under conditions effective to provide a reaction mixture comprising the capped polyindane oligomer.

12. A curable thermosetting composition comprising the capped polyindane oligomer of claim 1.

13. An article derived from the curable thermosetting composition of claim 12.

14. The article of claim 13, wherein the article is a composite, a foam, a fiber, a layer, a coating, an encapsulant, an adhesive, a sealant, a molded component, a prepreg, a casing, a cast article, a laminate, or a combination thereof.

15. The capped polyindane oligomer of claim 1, wherein $R^1$ and $R^2$ are each methyl.

* * * * *